United States Patent
Sheng et al.

(10) Patent No.: US 8,153,233 B2
(45) Date of Patent: Apr. 10, 2012

(54) PATTERNED COATINGS HAVING EXTREME WETTING PROPERTIES AND METHODS OF MAKING

(75) Inventors: Xiaoxia Sheng, Buffalo Grove, IL (US); Lei Zhai, Somerville, MA (US); Michael F. Rubner, Westford, MA (US); Robert E. Cohen, Jamaica Plain, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 1275 days.

(21) Appl. No.: 11/530,751

(22) Filed: Sep. 11, 2006

(65) Prior Publication Data

US 2007/0166513 A1 Jul. 19, 2007

Related U.S. Application Data

(63) Continuation-in-part of application No. 11/268,547, filed on Nov. 8, 2005.

(51) Int. Cl.
*D06N 7/04* (2006.01)
*B32B 7/04* (2006.01)
*B32B 5/16* (2006.01)
*B32B 5/14* (2006.01)

(52) U.S. Cl. ......... 428/141; 428/143; 428/212; 428/323
(58) Field of Classification Search .................... 428/141
See application file for complete search history.

(56) References Cited

U.S. PATENT DOCUMENTS

| | | | |
|---|---|---|---|
| 4,830,879 A | 5/1989 | Debsikdar | |
| 5,254,904 A | 10/1993 | Van De Leest et al. | |
| 5,334,629 A | 8/1994 | Zirino | |
| 5,580,819 A | 12/1996 | Li et al. | |
| 5,674,592 A * | 10/1997 | Clark et al. | 428/161 |
| 5,744,243 A | 4/1998 | Li et al. | |
| 6,156,389 A * | 12/2000 | Brown et al. | 427/393.4 |
| 6,177,131 B1 | 1/2001 | Glaubitt et al. | |
| 6,352,758 B1* | 3/2002 | Huang et al. | 428/143 |
| 6,451,871 B1 | 9/2002 | Winterton et al. | |
| 6,720,006 B2* | 4/2004 | Hanke et al. | 424/484 |
| 2001/0024684 A1 | 9/2001 | Steiner et al. | |
| 2001/0045676 A1 | 11/2001 | Winterton et al. | |
| 2001/0048975 A1 | 12/2001 | Winterton et al. | |
| 2002/0146555 A1* | 10/2002 | Hattori | 428/323 |
| 2002/0187335 A1 | 12/2002 | Kelley et al. | |
| 2003/0039742 A1 | 2/2003 | Qiu et al. | |
| 2003/0157260 A1 | 8/2003 | Rubner et al. | |
| 2003/0215626 A1 | 11/2003 | Hiller et al. | |
| 2004/0055993 A1 | 3/2004 | Moudgil et al. | |
| 2004/0067339 A1* | 4/2004 | Gandon et al. | 428/141 |
| 2004/0210289 A1 | 10/2004 | Wang et al. | |

(Continued)

OTHER PUBLICATIONS

Zhai, Lei, Fervzi C. Cebeci, Robert E. Cohen, and Michael F. Rubner. "Stable Superhydrophobic Coatings from Polyelectrolyte Multilayers." Nano Letters 2004 vol. 4, No. 7 1349-1353. May 18, 2004. Jun. 14, 2011. http://pubs.acs.org/doi/abs/10.1021/nl049463j.*

(Continued)

*Primary Examiner* — David Sample
*Assistant Examiner* — Nancy Rosenberg
(74) *Attorney, Agent, or Firm* — Steptoe & Johnson LLP

(57) ABSTRACT

A surface with superhydrophobic and hydrophilic or superhydrophilic regions can be made. The hydrophilic or superhydrophilic regions can selective collect water on the surface.

10 Claims, 17 Drawing Sheets

U.S. PATENT DOCUMENTS

| | | |
|---|---|---|
| 2005/0154086 A1 | 7/2005 | Yoneyama |
| 2005/0221271 A1 | 10/2005 | Murphy et al. |
| 2006/0029634 A1 | 2/2006 | Berg et al. |
| 2006/0029808 A1 | 2/2006 | Zhai et al. |

OTHER PUBLICATIONS

Ahn et al., "Self-assembled particle monolayers on polyelectrolyte multilayers: particle size effects on formation, structure, and optical properties," *Colloids and Surfaces A: Physicochem. Eng. Aspects* 2005, 259, 45.

Barthlott et al.; "Purity of the sacred lotus, or escape from contamination in biological surfaces," *Planta* 1997, 202, 1.

Bico et al., "Pearl Drops," *Europhys. Lett.* 1999, 47(6), 743-744.

Bico et al., "Rough Wetting," *Europhys. Lett.* 2001, 55, 214-220.

Bogdanovic et al., "Formation and Structure of Polyelectrolyte and Nanoparticle Multilayers: Effect of Particle Characteristics ," *J. Colloids Interface Science* 2002, 255, 44.

Cassie et al., "Wettability of porous surfaces," *Trans. Faraday Soc.* 1944, 40, 546.

Chen et al., "Ultrahydrophobic and Ultralyophobic Surfaces: Some Comments and Examples," *Langmuir* 1999, 15, 3395.

Dai et al., "Controlling the Permeability of Multilayered Polyelectrolyte Films through Derivatization, Cross-Linking, and Hydrolysis," *Langmuir* 2001, 17, 931.

Decher, "Fuzzy Nanoassemblies: Toward Layered Polymeric Multicomposites," *Science*, 1997, 277: 1232-1237.

Drelich et al., "Wetting characteristics of liquid drops at heterogeneous surfaces," *Colloids Surf. A* 1994, 93, 1.

Drelich et al., "The Effect of Solid Surface Heterogeneity and Roughness on the Contact Angle/Drop (Bubble) Size Relationship," *J. Colloid Interface Sci.* 1994, 164, 252-259.

Fery, "Nanoporous Thin Films Formed by Salt-Induced Structural Changes in Multilayers of Poly(acrylic acid) and Poly(allylamine)," *Langmuir*, 2001, 17(13): 3779-3783.

Gao et al., "Light-Excited Superhydrophilicity of Amorphous TiO2 Thin Films Deposited in an Aqueous Peroxotitanate Solution," *Langmuir* 2004, 20(8), 3188-3194.

Gau et al., "Liquid Morphologies on Structured Surfaces: From Microchannels to Microchips," *Science* 1999, 283, 46-49.

Gu et al., "Patterning of a Colloidal Crystal Film on a Modified Hydrophilic and Hydrophobic Surface," *Angewandte Chemie-International Edition* 2002, 41, (12), 2068-2070.

Hattori, "Anti-Reflection Surface with Particle Coating Deposited by Electrostatic Attraction," *Adv. Mater*, 2001, 13, 51.

Hiller et al., "Reversibly erasable nanoporous anti-reflection coatings from polyelectrolyte multilayers," *Nature Materials* 2002, 1, 59.

Hsu et al., "'Microcanals' for micropipette access to single cells in microfluidic environments," *Lab Chip* 2004, 4, 420-424.

Kim et al., "Nanoporous Thin Films with Hydrophilicity-Contrasted Patterns," *Chem Mater*. 2004, 16, 4267-4272.

Kim et al., "Photopatterned Nanoporous Media," *Nano Lett.* 2004, 4, 1169-1174.

Kommireddy et al., "Layer-by-Layer Assembly of TiO2 Nanoparticles for Stable Hydrophilic Biocompatible Coatings," *J. Nanosci. Nanotechnol.* 2005, 5, 1081.

Koo et al., "A Snowman-like Array of Colloidal Dimers for Antireflecting Surfaces," *Adv. Mater.* 2004, 16, 274.

Lau et al., "Superhydrophobic Carbon Nanotube Forests," *Nano Lett.* 2003, 3, 1701.

Lopez et al., "Imaging of features on surfaces by condensation figures," *Science* 1993, 260, 647-649.

Lvov et al., "Alternate Assembly of Ordered Multilayers of SiO2 and Other Nanoparticles and Polyions," *Langmuir* 1997, 13(23), 6195-6203.

Lvov et al., "High-speed multilayer film assembly by alternate adsorption of silica nanoparticles and linear polycation," *Chemical Communications* 1998, (11), 1229-1230.

McHale et al., "Topography Driven Spreading," *Physical Review Letters* 2004, 93(3), 036102.

Mendelsohn, "Fabrication of Microporous Thin Films from Polyelectrolyte Multilayers," *Langmuir*, 2000, 16: 5017-5023.

Mohammadi et al., "Effect of Surfactants on Wetting of Super-Hydrophobic Surfaces", *Langmuir* 2004, 20, 9657.

Neinhuis et al.; "Characterization and Distribution of Water-repellent, Self-cleaning Plant Surfaces," *Ann. Bot.* 1997, 79, 667-677.

Oner et al., "Ultrahydrophobic Surfaces. Effects of Topography Length Scales on Wettability," *Langmuir* 2000, 16, 7777.

Parker et al., "Water capture by a desert beetle," *Nature* 2001, 414, 33-34.

Rouse et al., "Preparation of Thin Silica Films with Controlled Thickness and Tunable Refractive Index," *J. Am. Chem. Soc.* 2003, 125, 15529.

Seemann et al., "Wetting morphologies at microstructured surfaces," *PNAS* 2005, 102, 1848-1852.

Sennerfors et al., "Formation, Chemical Composition, and Structure of Polyelectrolyte-Nanoparticle Multilayer Films;" *Langmuir* 2002, 18, 6410.

Shiratori, "pH-Dependent Thickness Behavior of Sequentially Adsorbed Layers of Weak Polyelectrolytes," *Macromolecules*, 2000, 33: 4213-4219.

Soeno et al., *Transactions of the Materials Research Society of Japan* 2003, 28, 1207.

Soeno et al., "Ultra-water-repellent surface: fabrication of complicated structure of $SiO_2$ nanoparticles by electrostatic self-assembled films," *Appl. Surf. Sci.* 2004, 237, 539-543.

Sun et al., "Reversible Switching between Superhydrophilicity and Superhydrophobicity," *Angewandte Chemie-International Edition* 2004, 43(3), 357-360.

Sun et al., "Control over the Wettability of an Aligned Carbon Nanotube Film," *J. Am. Chem. Soc.* 2003, 125, 14996-14997.

Tadanaga et al., "Superhydrophobic-Superhydrophilic Micropatterning on Flowerlike Alumina Coating Film by the Sol-Gel Method," *Chem. Mater.* 2000, 12, 590-592.

Unger, "Porous silica: its properties and use as support in column liquid chromatography," Elsevier Scientific Pub. Co.: Amsterdam, NY, pp. xi, 336 (1979).

Walheim et al., "Nanophase-separated polymer films as high-performance antireflection coatings," *Science*, 1999, 283, 520.

Wang et al., "Light-induced amphiphilic surfaces," *Nature* 1997, 388, (6641), 431-432.

Wenzel, "Resistance of solid surfaces to wetting by water," *Ind. Eng. Chem.* 1936, 28, 988.

Wenzel, "Surface Roughness and Contact Angle," *J. Phys. Colloid Chem.* 1949, 53, 1466.

Zhang et al., "Self-Cleaning Particle Coating with Antireflection Properties," *Chem. Mater.* 2005, 17, 696.

Zhang et al., "Polyelectrolyte Multilayer as Matrix for Electrochemical Deposition of Gold Clusters: Toward Super-Hydrophobic Surface," *J. Am. Chem. Soc.* 2004, 126, 3064.

\* cited by examiner

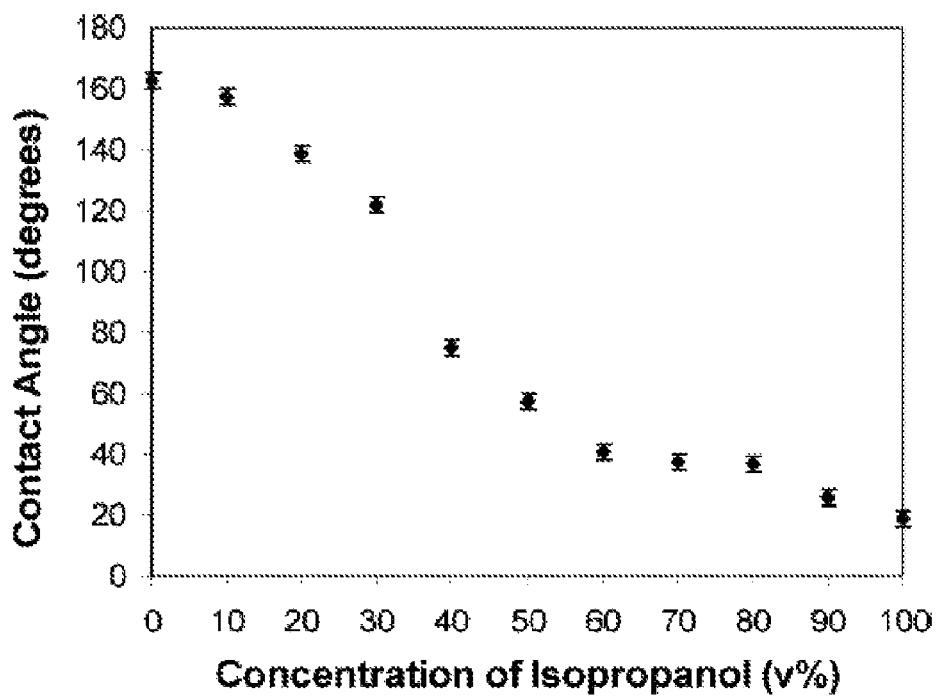
FIG. 12
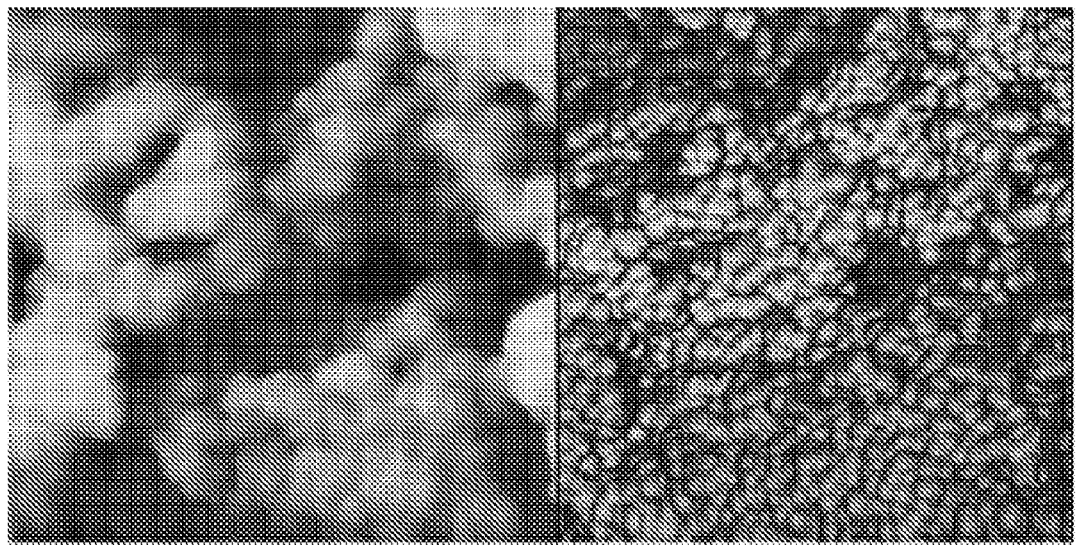
FIG. 13A  FIG. 13B

PATTERNED COATINGS HAVING EXTREME WETTING PROPERTIES AND METHODS OF MAKING

CLAIM OF PRIORITY

This application is a continuation-in-part of and claims priority to U.S. patent application Ser. No. 11/268,547, filed on Nov. 8, 2005, and titled "Superhydrophilic coatings", which is incorporated by reference in its entirety.

FEDERALLY SPONSORED RESEARCH OR DEVELOPMENT

The U.S. Government may have certain rights in this invention pursuant to Grant Nos. CTS-9729569 and DMR-9808941 awarded by the National Science Foundation.

TECHNICAL FIELD

This invention relates to patterned coatings having extreme wetting properties.

BACKGROUND

Polyelectrolyte multilayers can be easily assembled on a variety of surfaces. Selection of the materials, assembly conditions, and post-processing conditions can be used to control the chemical, structural and optical properties of the final product.

SUMMARY

Stable superhydrophilic coatings can be formed from layer-by-layer assembled films including nanoparticles and polyelectrolytes. The superhydrophilic coatings can be anti-fogging, anti-reflective, or both anti-fogging and anti-reflective.

In one aspect, a patterned surface includes a substrate supporting a coating including polyelectrolyte multilayer, where the surface includes a superhydrophilic region and a superhydrophobic region.

The polyelectrolyte multilayer can include a superhydrophilic region. The polyelectrolyte multilayer can include a superhydrophobic region. The polyelectrolyte multilayer can include a nanoparticle. The superhydrophobic region can have a water contact angle of greater than 150°.

In another aspect, a patterned surface includes a substrate supporting a superhydrophobic coating, which includes a high-roughness polyelectrolyte multilayer, a nanometer-scale feature associated with the high-roughness polyelectrolyte multilayer, and a hydrophobic material; and a region of reduced hydrophobicity superimposed on a predetermined region of the superhydrophobic coating.

The high-roughness polyelectrolyte multilayer can include a first organic polyelectrolyte. The high-roughness polyelectrolyte multilayer can include a second organic polyelectrolyte. The nanometer-scale feature can include a nanoparticle. The hydrophobic material can include a fluoropolymer. The superhydrophobic coating can have an advancing water contact angle of greater than 150°.

The region of reduced hydrophobicity can further include a third organic polyelectrolyte. The region of reduced hydrophobicity can be a hydrophilic region or a superhydrophilic region. The region of reduced hydrophobicity can include a polyelectrolyte multilayer supported by the superhydrophobic coating.

The surface can include an antibacterial agent. The antibacterial agent can include a silver nanoparticle or a quaternary amine.

In another aspect, a method of forming a patterned surface includes forming a superhydrophobic coating on a substrate, and contacting a predetermined region of the superhydrophobic coating with a wetting agent, so that the predetermined region is rendered less hydrophobic.

The wetting agent can include water, an organic solvent, and an electrolyte. The electrolyte can be a polyelectrolyte. The polyelectrolyte can include an organic polymer. The polyelectrolyte can include an inorganic nanoparticle.

The method can include forming a polyelectrolyte multilayer in the predetermined region. The polyelectrolyte multilayer in the predetermined region can be hydrophilic or superhydrophilic.

The details of one or more embodiments are set forth in the accompanying drawings and the description below. Other features, objects, and advantages will be apparent from the description and drawings, and from the claims.

BRIEF DESCRIPTION OF THE DRAWINGS

FIG. 12 is a graph showing contact angle for water/2-propanol mixtures on a superhydrophobic surface.

FIGS. 13A-D are atomic force micrographs of surfaces with extreme wetting properties.

DETAILED DESCRIPTION

Figure 1A:
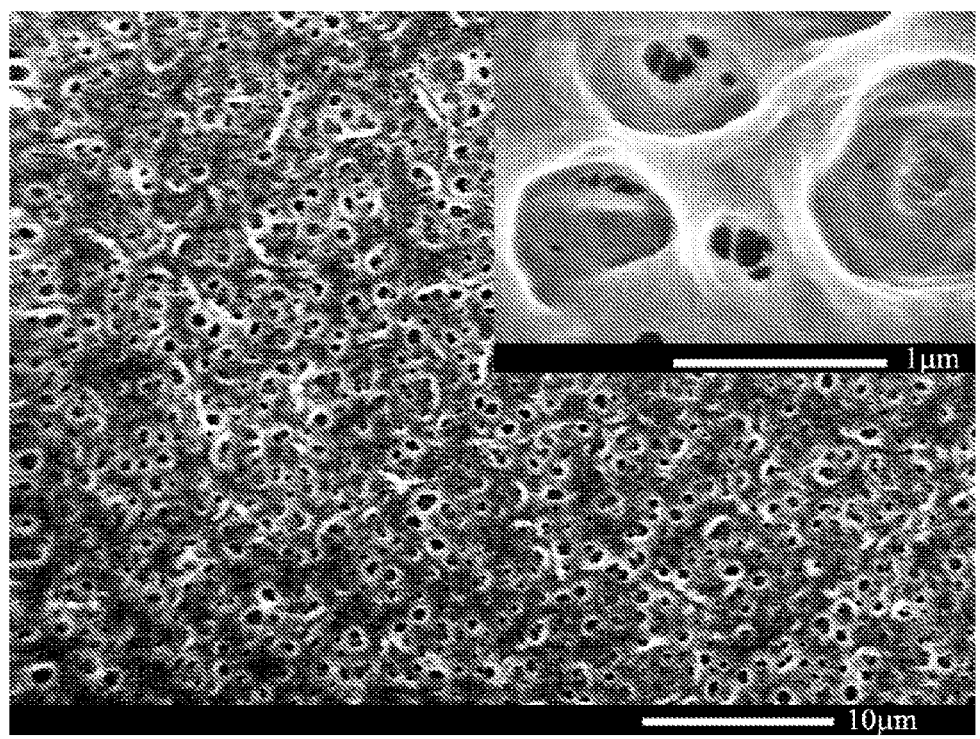
FIGS. 1A and 1B are scanning electron microscope images of porous polyelectrolyte multilayers.

Surfaces having a nanotexture can exhibit extreme wetting properties. A nanotexture refers to surface features, such as ridges, valleys, or pores, having nanometer (i.e., typically less than 1 micrometer) dimensions. In some cases, the features will have an average on the nanometer scale, even though some individual features may exceed 1 micrometer in size. The nanotexture can be a 3D network of interconnected pores. Depending on the structure and chemical composition of a surface, the surface can be hydrophilic, hydrophobic, or at the extremes, superhydrophilic or superhydrophobic. One method to create the desired texture is with a polyelectrolyte multilayer. Polyelectrolyte multilayers can also confer desirable optical properties to surfaces, such as anti-reflectivity, or reflectivity in a desired range of wavelengths. See, for example, U.S. Patent Application Publication Nos. 2003/0215626 and 2006/0029634, each of which is incorporated by reference in its entirety.

Hydrophilic surfaces attract water; hydrophobic surfaces repel water. In general, a non-hydrophobic surface can be made hydrophobic by coating the surface with a hydrophobic material. The hydrophobicity of a surface can be measured, for example, by determining the contact angle of a drop of water on the surface. The contact angle can be a static contact angle or dynamic contact angle. A dynamic contact angle measurement can include determining an advancing contact angle or a receding contact angle, or both. A hydrophobic surface having a small difference between advancing and receding contact angles (i.e., low contact angle hysteresis) can be desirable. Water droplets travel across a surface having low contact angle hysteresis more readily than across a surface having a high contact angle hysteresis.

A surface can be superhydrophilic. A superhydrophilic surface is completely and instantaneously wet by water, i.e., exhibiting water droplet advancing contact angles of less than 5 degrees within 0.5 seconds or less upon contact with water. See, for example, Bico, J. et al., *Europhys. Lett.* 2001, 55, 214-220, which is incorporated by reference in its entirety. At the other extreme, a surface can be superhydrophobic, i.e. exhibiting a water droplet advancing contact angles of 150° or higher. The lotus leaf is an example of a superhydrophobic surface (See Neinhuis, C.; Barthlott, *W. Ann. Bot.* 1997, 79, 677; and Barthlott, W.; Neinhuis, *C. Planta* 1997, 202, 1, each of which is incorporated by reference in its entirety). The lotus leaf also exhibits very low contact angle hysteresis: the receding contact angle is within 5° of the advancing contact angle (See, for example, Chen, W.; et al. *Langmuir* 1999, 15, 3395; and Oner, D.; McCarthy, T. J. *Langmuir* 2000, 16, 7777, each of which is incorporated by reference in its entirety).

Photochemically active materials such as $TiO_2$ can become superhydrophilic after exposure to UV radiation; or, if treated with suitable chemical modifications, visible radiation. Surface coatings based on $TiO_2$ typically lose their superhydrophilic qualities within minutes to hours when placed in a dark environment, although much progress has been made towards eliminating this potential limitation. See, for example, Gu, Z. Z.; Fujishima, A.; Sato, O. *Angewandte Chemie-International Edition* 2002, 41, (12), 2068-2070; and Wang, R.; et al., *Nature* 1997, 388, (6641), 431-432; each of which is incorporated by reference in its entirety.

Textured surfaces can promote superhydrophilic behavior. See, for example, Wenzel, R. N. *J. Phys. Colloid Chem.* 1949, 53, 1466; Wenzel, R. N. *Ind. Eng. Chem.* 1936, 28, 988; Cassie, A. B. D.; Baxter, S. *Trans. Faraday Soc.* 1944, 40, 546; Bico, J.; et al., D. *Europhysics Letters* 2001, 55, (2), 214-220; and Bico, J.; et al. *Europhysics Letters* 1999, 47, (6), 743-744, each of which is incorporated by reference in its entirety. Building on this work, it has recently been demonstrated that both lithographically textured surfaces and microporous surfaces can be rendered superhydrophilic. See, e.g., McHale, G.; Shirtcliffe, N. J.; Aqil, S.; Perry, C. C.; Newton, M. I. *Physical Review Letters* 2004, 93, (3), which is incorporated by reference in its entirety. The intriguing possibility of switching between a superhydrophobic and superhydrophilic state has also been demonstrated with some of these surface structures. See, for example, Sun, T. L.; et al. *Angewandte Chemie-International Edition* 2004, 43, (3), 357-360; and Gao, Y. F.; et al. *Langmuir* 2004, 20, (8), 3188-3194, each of which is incorporated by reference in its entirety.

Layer-by-layer processing of polyelectrolyte multilayers can be used to make conformal thin film coatings with molecular level control over film thickness and chemistry. Charged polyelectrolytes can be assembled in a layer-by-layer fashion. In other words, positively- and negatively-charged polyelectrolytes can be alternately deposited on a substrate. One method of depositing the polyelectrolytes is to contact the substrate with an aqueous solution of polyelectrolyte at an appropriate pH. The pH can be chosen such that the polyelectrolyte is partially or weakly charged. The multilayer can be described by the number of bilayers it includes, a bilayer resulting the sequential application of oppositely charged polyelectrolytes. For example, a multilayer having the sequence of layers PAH-PAA-PAH-PAA-PAH-PAA would be said to be made of three bilayers.

These methods can provide a new level of molecular control over the deposition process by simply adjusting the pH of the processing solutions. A nonporous polyelectrolyte multilayer can form porous thin film structures induced by a simple acidic, aqueous process. Tuning of this pore forming process, for example, by the manipulation of such parameters as salt content (ionic strength), temperature, or surfactant chemistry, can lead to the creation of micropores, nanopores, or a combination thereof. A nanopore has a diameter of less than 150 nm, for example, between 1 and 120 nm or between 10 and 100 nm. A nanopore can have diameter of less than 100 nm. A micropore has a diameter of greater than 150 nm, typically greater than 200 nm. Selection of pore forming conditions can provide control over the porosity of the coating. For example, the coating can be a nanoporous coating, substantially free of micropores. Alternatively, the coating can be a microporous coating having an average pore diameters of greater than 200 nm, such as 250 nm, 500 nm, 1 micron, 2 microns, 5 microns, 10 microns, or larger.

The properties of weakly charged polyelectrolytes can be precisely controlled by changes in pH. See, for example, G. Decher, Science 1997, 277, 1232; Mendelsohn et al., Langmuir 2000, 16, 5017; Fery et al., Langmuir 2001, 17, 3779; Shiratori et al., Macromolecules 2000, 33, 4213; and U.S. patent application Ser. No. 10/393,360, each of which is incorporated by reference in its entirety. A coating of this type can be applied to any surface amenable to the water based layer-by-layer (LbL) adsorption process used to construct these polyelectrolyte multilayers. Because the water based process can deposit polyelectrolytes wherever the aqueous solution contacts a surface, even the inside surfaces of objects having a complex topology can be coated. In general, a polyelectrolyte can be applied to a surface by any method amenable to applying an aqueous solution to a surface, such as dipping or spraying.

Surfaces with extreme wetting behavior can be fabricated from a polyelectrolyte coating. See, for example, U.S. Patent Application Publication No. 2006/0029634, which is incorporated by reference in its entirety. A polyelectrolyte has a backbone with a plurality of charged functional groups attached to the backbone. A polyelectrolyte can be polycationic or polyanionic. A polycation has a backbone with a plurality of positively charged functional groups attached to the backbone, for example poly(allylamine hydrochloride). A polyanion has a backbone with a plurality of negatively charged functional groups attached to the backbone, such as sulfonated polystyrene (SPS) or poly(acrylic acid), or a salt thereof. Some polyelectrolytes can lose their charge (i.e., become electrically neutral) depending on conditions such as pH. Some polyelectrolytes, such as copolymers, can include both polycationic segments and polyanionic segments.

Superhydrophilic surfaces can be created from multilayer films. Such conformable superhydrophilic surfaces can be used in, for example, anti-reflective or anti-fogging applications. Superhydrophobic surfaces can be created from multilayer films. Such conformable superhydrophobic surfaces can have applications as antifouling, self-cleaning and water resistant coatings, as an anti-cell adhesion (e.g., antibacterial) coating, as an electrical or thermal insulating coating, as a flow-increasing coating (e.g., on the interior wall of a pipe) and as coatings for microfluidic channels and biosensors.

Multilayer thin films containing nanoparticles of $SiO_2$ can be prepared via layer-by-layer assembly (see Lvov, Y.; Ariga, K.; Onda, M.; Ichinose, I.; Kunitake, T. *Langmuir* 1997, 13, (23), 6195-6203, which is incorporated by reference in its entirety). Other studies describe multilayer assembly of $TiO_2$ nanoparticles, $SiO_2$ sol particles and single or double layer nanoparticle-based anti-reflection coatings. See, for example, Zhang, X-T.; et al. *Chem. Mater.* 2005, 17, 696; Rouse, J. H.; Ferguson, G. S. *J. Am. Chem. Soc.* 2003, 125, 15529; Sennerfors, T.; et al. *Langmuir* 2002, 18, 6410; Bogdanvic, G.; et al. *J. Colloids Interface Science* 2002, 255, 44; Hattori, H. *Adv. Mater.* 2001, 13, 51; Koo, H. Y.; et al. *Adv. Mater.* 2004, 16, 274; and Ahn, J. S.; Hammond, P. T.; Rubner, M. F.; Lee, I. *Colloids and Surfaces A: Physicochem. Eng. Aspects* 2005, 259, 45, each of which is incorporated by reference in its entirety. Incorporation of $TiO_2$ nanoparticles into a multilayer thin film can improve the stability of the superhydrophilic state induced by light activation. See, e.g., Kommireddy, D. S.; et al. *J. Nanosci. Nanotechnol.* 2005, 5, 1081, which is incorporated by reference in its entirety.

Broadband anti-reflectivity can be attained using an inexpensive, simple process employing aqueous solutions of polymers. See, for example, U.S. Patent Application Publication No. 2003/0215626, which is incorporated by reference in its entirety. The process can be used to apply a high-efficiency conformal anti-reflective coating to virtually any surface of arbitrary shape, size, or material. The process can be used to apply the anti-reflective coating to more than one surface at a time and can produce coatings that are substantially free of pinholes and defects, which can degrade coating performance. The porous polymeric material can be anti-reflective. The process can be used to form anti-reflective and antiglare coatings on polymeric substrates. The simple and highly versatile process can create molecular-level engineered conformal thin films that function as low-cost, high-performance anti-reflection and antiglare coatings. The method can uniformly coat both sides of a substrate at once to produce defect and pinhole-free transparent coatings. The process can be used to produce high-performance polymeric optical components, including flat panel displays and solar cells.

Similarly, the polymer coating can be an anti-fogging coating. The anti-fogging coating can prevent condensation of light-scattering water droplets on a surface. By preventing the formation of light-scattering water droplets on the surface, the coating can help maintain optical clarity of a transparent surface, e.g., a window or display screen. The coating can be both anti-reflective and anti-fogging. A surface of a transparent object having the anti-fogging coating maintains its transparency to visible light when compared to the same object without the anti-fogging coating under conditions that cause water condensation on the surface.

A superhydrophilic coating can be made by depositing a polyelectrolyte multilayer film on a substrate and treating the multilayer to induce a porosity transition. The porosity transition can give rise to nanoscale porosity in the multilayer. Nanoparticles can be applied to further augment the texture of the surface. Finally, a hydrophobic material can be applied to render the surface superhydrophobic. Before the hydrophobic material is applied, the surface can be superhydrophilic.

Polyelectrolyte multilayer films have been used as a template to provide the surface roughness of a superhydrophobic surface. A layer-by-layer process was used to assemble a polyelectrolyte multilayer containing $SiO_2$ nanoparticles. The film was then heated to 650° C. to remove the polyelectrolytes and create the surface texture needed for superhydrophobic behavior (see Soeno, T., et al., *Transactions of the Materials Research Society of Japan* 2003, 28, 1207, which is incorporated by reference in its entirety). In another example, dendritic gold clusters were electrochemically deposited onto indium tin oxide (ITO) electrodes covered with a polyelectrolyte multilayer film. After the deposition of a n-dodecanethiol monolayer on the gold clusters, the surface showed superhydrophobic behavior (see Zhang, X., et al., *J. Am. Chem. Soc.* 2004, 126, 3064, which is incorporated by reference in its entirety). The electrochemical deposition process used to create these films can limit the types of materials that this method can be used to form a superhydrophobic coating on.

A superhydrophobic surface can include a polyelectrolyte multilayer. A surface can be coated with the multilayer using a layer-by-layer method. Treatment of the multilayer can induce the formation of roughness in the multilayer. The multilayer can become a high roughness multilayer. High roughness can be micrometer scale roughness. The high roughness surface can have an rms roughness of 100 nm, 150 nm, 200 nm, or greater. Treatments that induce the formation of high roughness can include an acid treatment or a salt treatment (i.e., treatment with an aqueous solution of a salt). Formation of pores in the polyelectrolyte multilayer can lead to the development of high roughness in the multilayer. Appropriate selection of conditions (e.g., pH, temperature, processing time) can promote formation of pores of different sizes. The pores can be micropores (e.g., pores with diameters at the micrometer scale, such as greater than 200 nm, greater than 500 nm, greater than 1 micrometer, or 10 micrometers or later). A microporous polyelectrolyte multilayer can be a high roughness polyelectrolyte multilayer.

A high roughness polyelectrolyte multilayer can be formed by forming the polyelectrolyte multilayer over a high roughness surface. When the polyelectrolyte multilayer is formed over a high roughness surface, a treatment to increase the thickness of the polyelectrolyte multilayer can be optional. The high roughness surface can include, for example: particles, such as microparticles or microspheres; nanoparticles or nanospheres; or an area of elevations, ridges or depressions. The micrometer scale particles can be, for example, particles of a clay or other particulate material. Elevations, ridges or depressions can be formed, for example, by etching, depositing micrometer scale particles, or photolithography on a suitable substrate.

A lock-in step can prevent further changes in the structure of the porous multilayer. The lock-in can be achieved by, for example, exposure of the multilayer to chemical or thermal polymerization conditions. The polyelectrolytes can become cross-linked and unable to undergo further transitions in porosity. In some cases, chemical crosslinking step can include treatment of a polyelectrolyte multilayer with a carbodiimide reagent. The carbodiimide can promote the formation of crosslinks between carboxylate and amine groups of the polyelectrolytes. A chemical crosslinking step can be preferred when the polyelectrolyte multilayer is formed on a substrate that is unstable at temperatures required for crosslinking (such as, for example, when the substrate is polystyrene). The crosslinking step can be a photocrosslinking step. The photocrosslinking can use a sensitizer (e.g., a light-sensitive group) and exposure to light (such as UV, visible or IR light) to achieve crosslinking. Masks can be used to form a pattern of crosslinked and non-crosslinked regions on a surface. Other methods for crosslinking polymer chains of the polyelectrolyte multilayer are known.

Nanoparticles can be applied to the multilayer, to provide a nanometer-scale texture or roughness to the surface. The nanoparticles can be nanospheres such as, for example, silica nanospheres, titania nanospheres, polymer nanospheres (such as polystyrene nanospheres), or metallic nanospheres. The nanoparticles can be metallic nanoparticles, such as gold or silver nanoparticles. The nanoparticles can have diameters of, for example, between 1 and 1000 nanometers, between 10 and 500 nanometers, between 20 and 100 nanometers, or between 1 and 100 nanometers. The intrinsically high wettability of silica nanoparticles and the rough and porous nature of the multilayer surface establish favorable conditions for extreme wetting behavior.

A surface can be coated with a hydrophobic material. In general, any hydrophobic material that can be applied over the surface can be used. A material that reacts chemically or physically with a polyelectrolyte multilayer can be used. The hydrophobic material can be chemically bonded to the multilayer, to the nanoparticles, or to both. The hydrophobic material can be a polymeric material, such as a poly(tetrafluoroethylene) or a hydrophobic polysiloxane. The hydrophobic material can be a fluoropolymer, or a fluorosilane. The hydrophobic material can be applied to the surface by a vapor deposition process, e.g., chemical vapor deposition (CVD) or hot filament chemical vapor deposition (HFCVD). See, for example, Lau, K. K. S. et al., *Nano Lett.* 2003, 3, 1701, which is incorporated by reference in its entirety.

Superhydrophilic coatings can be created from multilayers without the need for treating the multilayer to induce a porosity transition. For example, the multilayer can include a polyelectrolyte and a plurality of hydrophilic nanoparticles. By choosing appropriate assembly conditions, a 3D nanoporous network of controllable thickness can be created with the nanoparticles. The network can be interconnected—in other words, the nanopores can form a plurality of connected voids. Rapid infiltration (nano-wicking) of water into this network can drive the superhydrophilic behavior.

A single surface can include regions having different wetting properties. For example, a surface can be prepared with a pattern of hydrophilic, hydrophobic, superhydrophilic, superhydrophobic regions, or a combination of such regions. Patterned surfaces with dissimilar wetting properties have been achieved using techniques such as microcontact printing, chemical vapor deposition, and photolithography. See, for example, Lopez, G. P., et al., *Science* 1993, 260, 647; Drelich, J., et al., *Colloids Surf. A* 1994, 93, 1; Sun, T., et al., *J. Am. Chem. Soc.* 2003, 125, 14996; Tadanaga, K., et al., *Chem. Mater.* 2000, 12, 590; Kim. H. et al., *Chem Mater.* 2004, 16, 4267; and Kim, H.-C., et al., *Nano Lett.* 2004, 4, 1169, each of which is incorporated by reference in its entirety. However, these approaches often involve complicated procedures to introduce functional groups to the patterned areas, or are limited by the range of functional groups that can be introduced to the patterned areas.

Surfaces with patterned extreme wetting properties, such as superhydrophilic patterns on a superhydrophobic surface, can be prepared by a simple solution-based process. The resulting patterns can be used as, for example, a planar microchannel or open-air microfluidic channel.

Such open-air microfluidic channels offer advantages such as facile handling of small amounts of liquids, massive parallel processing, direct accessibility and ease of cleaning. See, for example, Gau, H., et al., *Science* 1999, 283, 46; Hsu, C.-H., et al., *Lab Chip* 2004, 4, 420; and Seemann, R., et al., *PNAS* 2005, 102, 1848; each of which is incorporated by reference in its entirety.

A surface patterned with superhydrophobic and hydrophilic regions can be prepared by selectively contacting a predetermined region of a superhydrophobic surface with a wetting reagent. The wetting reagent is capable of wetting the superhydrophobic surface. As such, the wetting reagent is generally an aqueous solution or mixture, but not substantially pure water. The wetting reagent can a low-surface tension liquid, such as for example, an aqueous solution of a surfactant; an aqueous solution of a lower alcohol (e.g., methanol, ethanol, propanol, isopropanol, a butanol, a pentanol, or a hexanol); or a combination thereof. In some cases, the wetting reagent can include an electrolyte or polyelectrolyte which can infiltrate the regions of the surface contacted by the wetting reagent. See, for example, Mohammadi, R., et al., *Langmuir* 2004, 20, 9657; Soeno, T., et al., *Appl. Surf. Sci.* 2004, 237, 543, each of which is incorporated by reference in its entirety. When the solvent portion of the wetting reagent is removed, the polyelectrolyte can remain on the surface, altering the wetting properties of the surface in the contacted region. Thus, a water-alcohol-electrolyte (or polyelectrolyte) mixture can be selectively contacted to a predetermined region of a superhydrophobic surface to create a hydrophilic region on the surface. The size of the predetermined region can be controlled, for example, by the amount of wetting reagent used. Smaller amounts of wetting reagent can create smaller regions of altered wetting properties.

The substrate upon which multilayers are deposited can be substantially planar or non-planar. Non-planar substrates can include features such as elevations, depressions, ridges, valleys, curves, angles, or other deviations from planarity. Non-planar substrates can have a repeating pattern of non-planarity (e.g., an array of bumps, pillars, depressions, channels, or the like), or can have an irregular (e.g., random or stochastic) pattern of non-planarity. As one example, an initially planar substrate (such as a glass slide) can be provided with an irregular pattern of non-planarity by sparsely distributing small (<1 mm) plastic beads (e.g., 200 μm PMMA beads) on the substrate, and melting the beads.

Desired chemistries can be included in the polyelectrolyte multilayers. The chemistry can be added during manufacture of the multilayer, or as discussed below, after manufacture.

For example, antibacterial chemistries (such as silver nanoparticles or quaternary ammonium salts) can be included in the multilayer during manufacture. The resulting multilayer can then have desired properties (such as antibacterial properties) arising from the incorporated chemistry. In some circumstances, the chemistry can be controllably released from the multilayer.

EXAMPLES

Multilayers assembled from poly(allylamine hydrochloride) (PAH) and poly(acrylic acid) (PAA) with the PAH dipping solution at a pH of 7.5 or 8.5 and the PAA dipping solution at a pH of 3.5 (designated PAH/PAA 7.5/3.5 or 8.5/3.5) formed microporous structures when treated at pH 2.4 followed by a deionized water rinse. See, for example, Mendelsohn, J. D., et al., *Langmuir* 2000, 16, 5017; and Hiller, J. et al. *Nature Materials* 2002, 11, 59, each of which is incorporated by reference in its entirety. The rms surface roughness of these films after treatment was below 100 nm, too low to promote stable superhydrophobic behavior. By using an appropriate combination of acidic treatments, PAH/PAA 8.5/3.5 films were induced to form pores of a size on the order of 10 micrometers and a honeycomb-like structure on the surface. The rms surface roughness of such films can be more than 400 nm, making them ideally suited for use as the high roughness template of a superhydrophobic surface. It can be preferable not to rinse the film with water after low pH treatment. A staged low pH treatment can be preferable to a single low pH treatment.

PAH ($M_w$=70,000) was obtained from Sigma-Aldrich (St. Louis, Mo.). PAA ($M_w$=90,000) and silica nanoparticles were obtained from Polysciences (Warrington, Pa.) or were Ludox® TM-40 (40 wt % $SiO_2$ suspension in water, average particle size of 22 nm, and specific surface area of 140 $m^2 g^{-1}$) from Sigma-Aldrich. (Tridecafluoro-1,1,2,2-tetrahydrooctyl)-1-trichlorosilane was obtained from United Chemical Technology, Inc, or from Sigma-Aldrich. Deionized water (>18 MΩ cm, Millipore Milli-Q), with an unadjusted pH of approximately 5.5, was exclusively used in all aqueous solutions and rinsing procedures.

Polyelectrolyte multilayers were assembled on glass microscope slides or 3-aminopropyltriethoxysilane coated microscope slides (LabScientific, Inc.) using an automated Zeiss HMS slide stainer as previously described. (See, for example, Shiratori, S. S.; Rubner, M. F. *Macromolecules* 2000, 33, 4213.) Glass substrates were degreased in a detergent solution followed by deionized water rinses prior to multilayer assembly. Silane coated microscope slides were used as received.

PAH/PAA multilayer films were built using pH 8.5 PAH ($10^{-2}$ M by repeat unit) and pH 3.5 PAA ($10^{-2}$ M) aqueous solutions which were pH adjusted by using either 1 M NaOH or 1 M HCl. The first four PAH/PAA bilayers on glass slides were formed by first immersing substrates into the PAH solution for 15 minutes followed by one 2 minute and two 1 minute immersions into water as rinsing steps. Then, the substrates were immersed into the PAA solution for 15 min followed by identical rinsing steps. The remaining layers were assembled by immersion into the polyelectrolyte solutions for 30 seconds followed by one 1 minute and two 30 second immersions into water as rinsing steps. The adsorption and rinsing steps were repeated until the desired numbers of bilayers were obtained. One bilayer is defined as a single adsorption of a polycation followed by an adsorption of a polyanion; thus a half-integer number of bilayers of PAH/PAA ends with PAH as the outermost layer. A low pH treatment (for example, at a pH of less than pH 5, less than pH 4, between pH 0 and pH 4, or between pH 2 and pH 3) of the polyelectrolyte multilayer introduced pores in the multilayer. The low pH treatment can be a one step treatment or a multistep treatment. For example, a two step treatment can include treatment of the multilayer a pH 2.7 solution and a pH 2.3 solution. The polyelectrolyte multilayers were crosslinked by a 2 hour heat treatment at 180° C.

1.5 bilayers of silica nanoparticles/PAH were deposited on the crosslinked porous multilayer films using a 0.06% aqueous colloidal dispersion of silica nanoparticles and pH 8.5 PAH ($10^{-2}$ M by repeat unit) by first immersing the film into the silica nanoparticle suspension for 5 minutes followed by one 1 minute and two 30 second immersions into water as rinsing steps. Then, the film was immersed into the PAH solution for 5 minutes followed by identical rinsing steps. The film was immersed in the silica nanoparticle solution again for 5 minutes followed by one 1 minute and two 30 second immersions into water as rinsing steps.

The silane treatment was carried out by a chemical vapor deposition of (tridecafluoro-1,1,2,2-tetrahydrooctyl)-1-trichlorosilane. Samples were placed in a vacuum chamber together with (tridecafluoro-1,1,2,2-tetrahydrooctyl)-1-trichlorosilane. CVD was performed by applying a 1 Torr vacuum to the chamber at room temperature for 2 hours. Then, the samples were placed in an oven and heated at 180° C. for 2 hours.

Figure 1B:
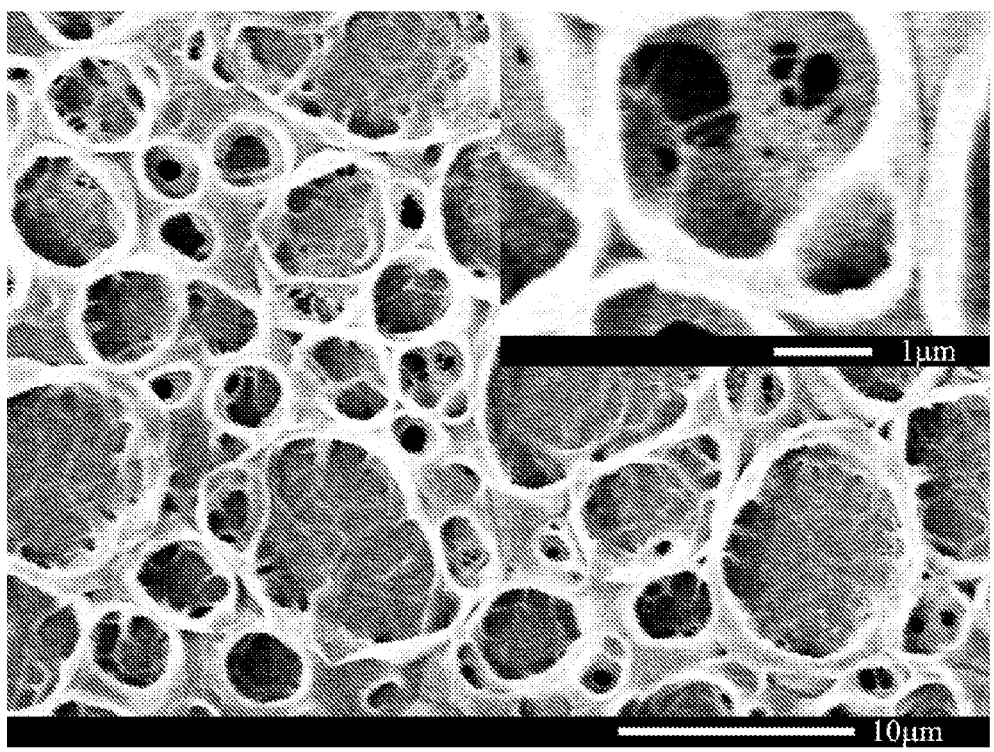

FIG. 1A shows a scanning electron microscope (SEM) image of a porous PAH/PAA 8.5/3.5 film containing 100.5 assembled bilayers that was created by a single low pH treatment (6 hour immersion in a pH 2.3 solution, with no water rinse). The resultant film exhibits surface pores on the order of 0.5-2 microns and an RMS surface roughness of about 100 nm. In contrast, a 100.5 bilayer PAH/PAA 8.5/3.5 porous film created by a combination of two low pH treatments (i.e., a 2 hour immersion in a pH 2.7 solution followed by a 4 hour immersion in a pH 2.3 solution, with no water rinse) had a surface roughness of about 440 nm (FIG. 1B). This film exhibits a honeycomb-like texture with sharp ridges and surface pores as large as 10 micrometers. The surface roughness decreased dramatically when a water rinse (pH about 5.5) followed these low pH treatments.

The two porous PAH/PAA 8.5/3.5 films with micrometer-scale surface roughness were used as templates for nanoparticle deposition. Both structures were first thermally crosslinked at 180° C. for two hours to preserve desirable surface morphological features throughout the subsequent processing steps (see Dai, J., et al., *Langmuir* 2001, 17, 931, which is incorporated by reference in its entirety). Nanoscale texture was introduced by depositing 50 nm $SiO_2$ nanoparticles onto the surfaces via alternating dipping of the substrates into an aqueous suspension of the negatively charged nanoparticles and an aqueous PAH solution followed by a final dipping of the substrates into the nanoparticle suspension. The surfaces were then modified by a chemical vapor deposition (CVD) of (tridecafluoro-1,1,2,2-tetrahydrooctyl)-1-trichlorosilane (semifluorinated silane) followed by a 2 hour heating at 180° C. to remove unreacted semifluorinated silane. These final steps rendered the entire surface hydrophobic.

Figure 2:
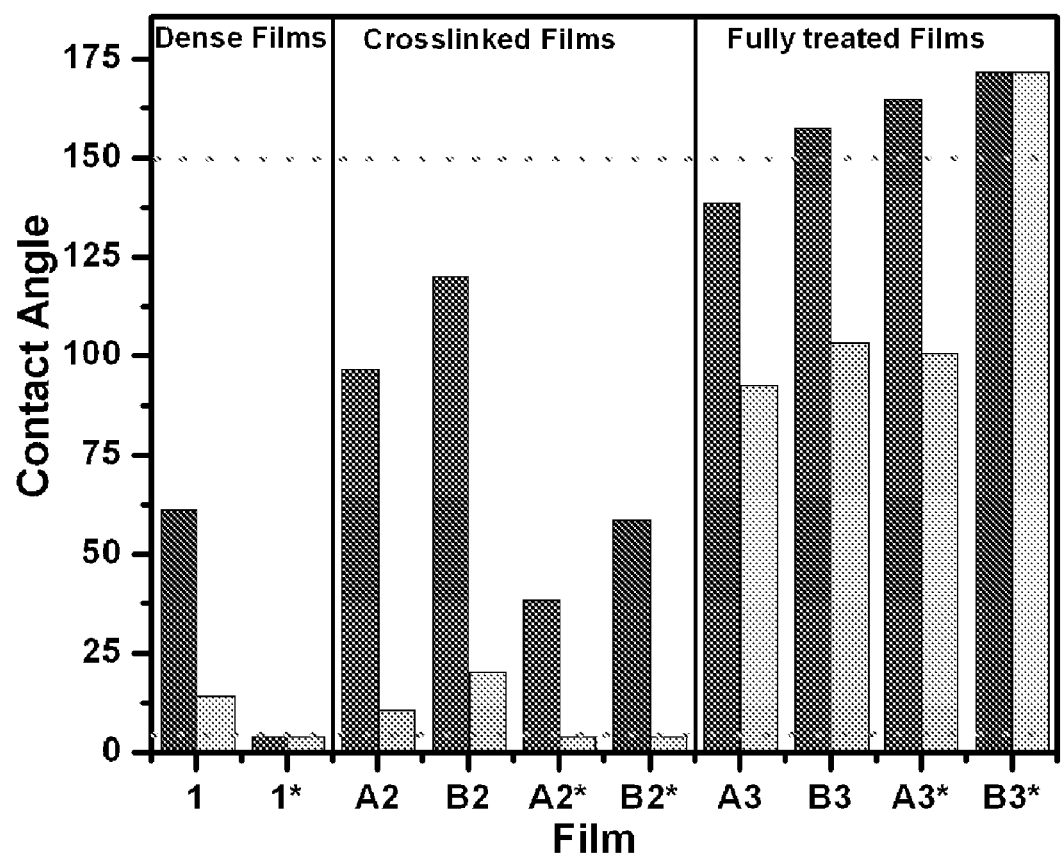
FIG. 2 is a graph depicting water contact angles for different surfaces.

Dynamic contact angle measurements were carried out on the two types of structures depicted in FIG. 1 after each treatment step to reveal the relationship between contact angle and surface morphology and chemistry. FIG. 2 shows the dynamic contact angles measured from structure A (i.e., the structure depicted in FIG. 1A) and structure B (i.e., the structure depicted in FIG. 1B) at various stages of the process.

Both advancing (black bars) and receding (grey bars) contact angles were measured from as-assembled dense films, crosslinked microporous films, and fully treated microporous films, each with and without the surface bound $SiO_2$ nanoparticles (structures with $SiO_2$ nanoparticles are indicated by *). At each treatment step, the advancing contact angle measured from structure B was larger than that measured from structure A, consistent with the predictions of both the Wenzel and Cassie models (for a given chemical composition, rougher surfaces exhibit larger advancing contact angles). The deposition of hydrophilic silica nanoparticles onto the surfaces of both crosslinked structures caused the advancing contact angle to decrease, since the surfaces were covered with more wettable hydrophilic groups. After the deposition of the semifluorinated silane and heating, all surfaces changed from hydrophilic to hydrophobic with large advancing contact angles (>120°).

Among the surfaces coated with semifluorinated silane, superhydrophobic character (advancing contact angle >150°) was observed from all surfaces except structure A without nanoparticles. A low contact angle hysteresis was exhibited by structure B coated with nanoparticles. In this case, water droplets freely rolled off the surface without becoming pinned even after sitting on the surface for long times. In contrast, water droplets on the surfaces of structure A coated with nanoparticles and on the surface of structure B without nanoparticles started to become pinned after sitting on the surface for a couple of minutes, suggesting a transition from the Cassie state to the Wenzel state. Both the microstructure created by the combined acid treatments and the nanostructure induced by the deposition of nanoparticles can be important for the formation of stable superhydrophobic surfaces.

Figure 3A:
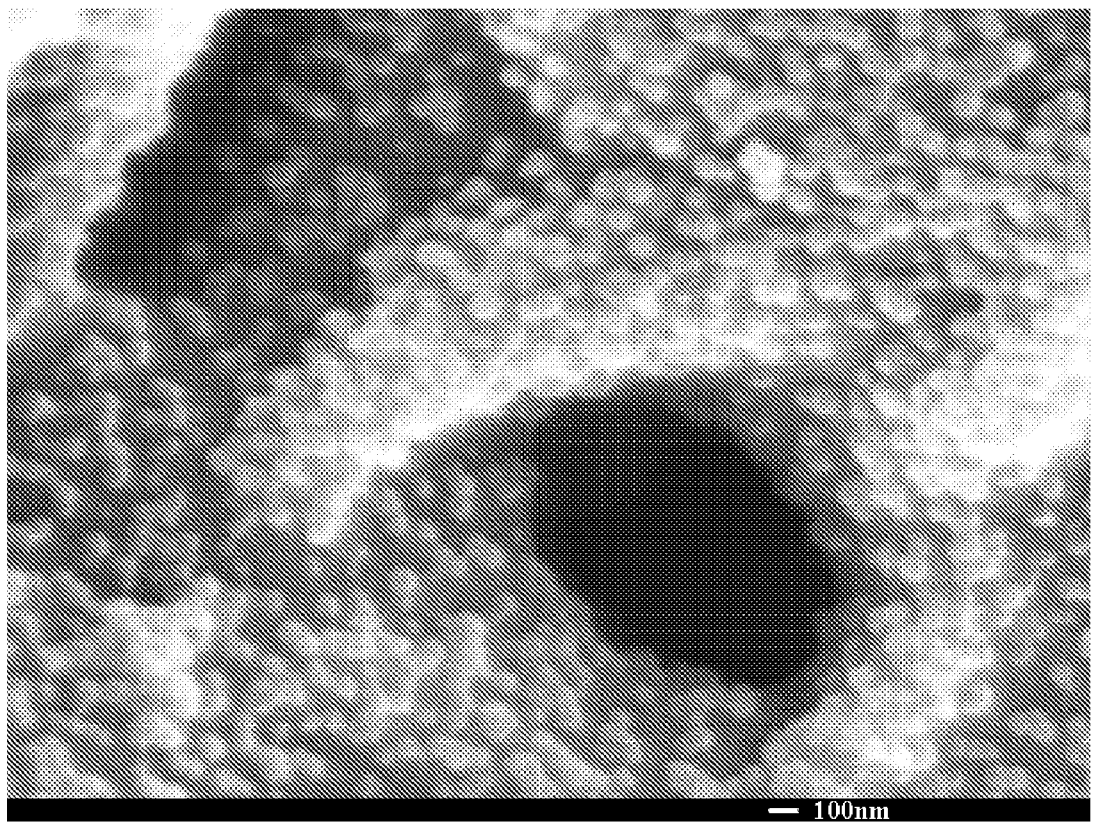
FIG. 3A is a scanning electron microscope image of a superhydrophobic surface.
Figure 3B:
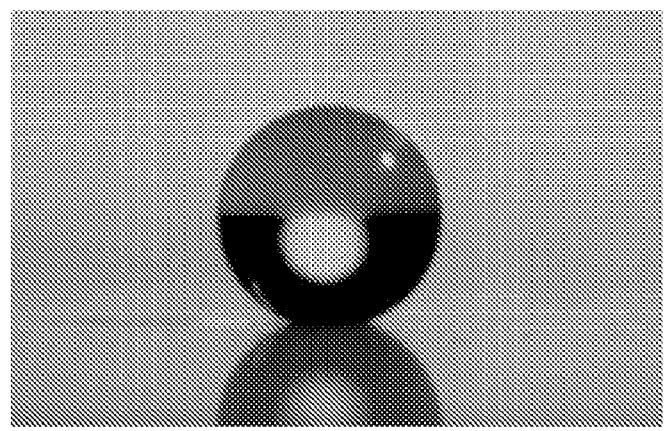
FIG. 3B is a photograph of a water droplet on the superhydrophobic surface.

FIG. 3A shows a high resolution SEM image of the final superhydrophobic surface fabricated from structure B. The nanoparticles decorated the surface of the micropores, forming a two-level structure that conceptually mimics the lotus leaf surface. FIG. 3B shows a water droplet on this surface, having an advancing contact angle of 172°. The lowest angle needed to induce sliding of a 4 mg water droplet on this surface was less than 2°, which suggests a very small contact angle hysteresis with essentially no pinning of the water droplet. This surface remained superhydrophobic after being immersed in water for at least a week, or after being stored in a high humidity environment for at least a month. This stands in contrast to the superhydrophobic surface created from structure A (A3* in FIG. 2), which lost its superhydrophobic character after a brief immersion in water.

Figure 4A:
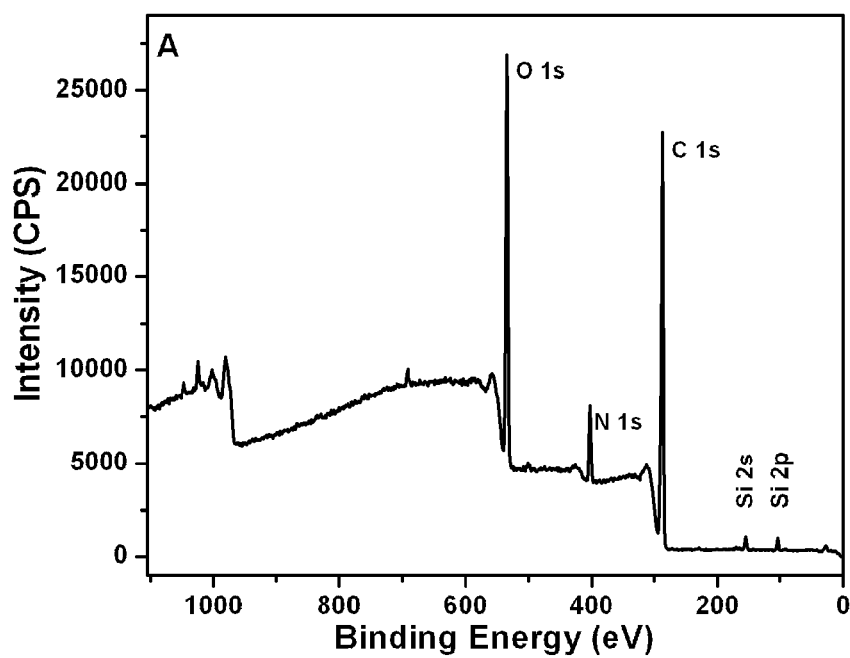
FIGS. 4A and 4B are graphs depicting X-ray photoelectron spectroscopy measurements of surfaces.
Figure 4B:
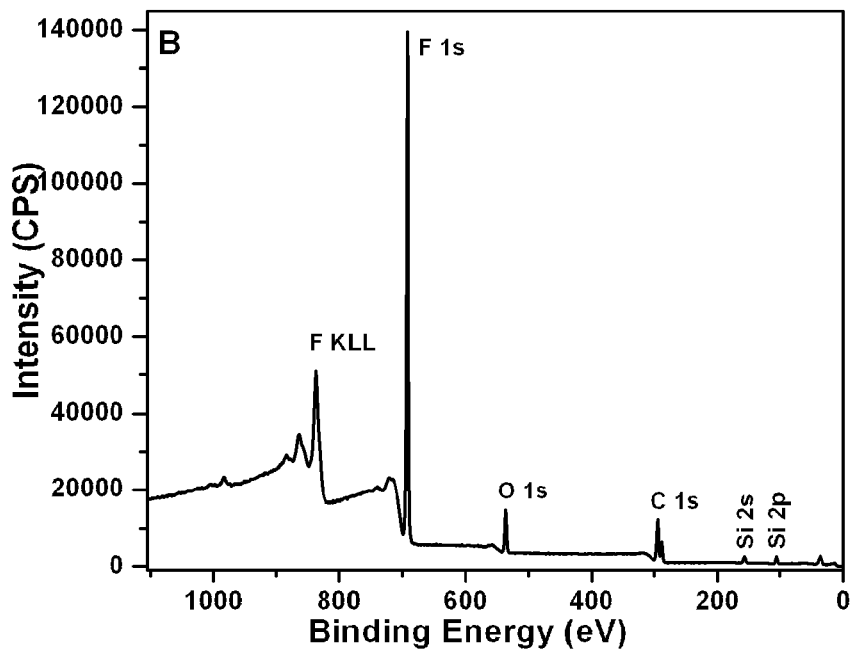

X-ray photoelectron spectroscopy (XPS) confirmed that the superhydrophobic surface of structure B was modified with the semifluorinated silane (FIG. 4). The XPS spectrum of the crosslinked porous multilayer film with silica nanoparticles showed no detectable fluorine peaks (FIG. 4A), whereas the spectrum of the semifluorinated silane coated film displayed a strong fluorine peak at 688 eV (FIG. 4B). This strong fluorine peak suggests the formation of a polymerized silane film on the surface that is thicker than a single monolayer. The silicon peaks located at 156 eV and 103 eV in FIG. 4A are attributed to the silica nanoparticles deposited on the surface of the crosslinked multilayer film. After the CVD of (tridecafluoro-1,1,2,2-tetrahydrooctyl)-1-trichlorosilane and the subsequent thermal treatment, the intensity of these peaks increased due to the formation of the polymerized silane film (FIG. 4B). In addition to reacting with the silica nanoparticles, the semifluorinated silane can also react with free amine groups on the surface of the crosslinked multilayer film. This was confirmed by examining the XPS spectrum of a porous crosslinked film without nanoparticles after CVD and thermal treatment: a strong fluorine peak located at 688 eV was also observed in this case.

A straight-forward procedure can create stable superhydrophobic coatings from polyelectrolyte multilayers. It is possible to coat any substrate or object amenable to the layer-by-layer deposition process, which is essentially all surfaces. Superhydrophobic coatings can be prepared from PAH/PAA multilayers with as few as 20 bilayers and with shorter treatment and crosslinking times.

A 20.5 bilayer PAH/PAA (7.5/3.5) film was immersed in a pH 2.7 solution for 20 minutes and a pH 2.3 solution for 40 minutes. The film was then dried with air and crosslinked at 180° C. for 2 hours. An additional 3.5 bilayers of PAH/silica nanoparticles were deposited on the surface, followed by CVD of semifluorinated silane. After a 2 hour heat treatment at 180° C., the surface was superhydrophobic.

Superhydrophobic coatings were successfully made on fibers.

Semifluorinated silane was deposited on acid treated films bearing silica nanoparticles by immersing the samples into 0.4% (v/v) isopropanol solution of (tridecafluoro-1,1,2,2-tetrahydrooctyl)-1-trichlorosilane for 5 seconds, or by spin coating a 2% (v/v) isopropanol solution of (tridecafluoro-1,1,2,2-tetrahydrooctyl)-1-trichlorosilane. Superhydrophobic surfaces were obtained after heating the films at 130° C. for 10 minutes.

A superhydrophobic surface was patterned with hydrophilic regions by printing 0.25% (w/v) isopropanol solutions of poly(acrylic acid) on the superhydrophobic surfaces using an Epson inkjet print or a cotton swab. This can also be achieved by using a 2% (w/w) isopropanol solution of titanium (IV) isopropoxide.

The multilayers can be superhydrophilic prior to coating with a hydrophobic material. The superhydrophilic behavior is characterized by nearly instantaneous wetting by water, and advancing and receding contact angles differ by less than 5°. Thus, this approach can create both superhydrophobic and superhydrophilic coatings with identical surface morphologies but with dramatically different wetting characteristics. A surface can include both superhydrophobic and superhydrophilic regions. The superhydrophobic and superhydrophilic regions can form a pattern on the surface. Such a patterned surface could be useful, for example, in a microfluidic device.

The superhydrophobic surface can trap a layer of air at the superhydrophobic surface when submerged under water. Because of the difference in refractive indices between water and air, this air layer can act as a mirror.

To prepare a superhydrophilic surface, four bilayers of alternating PAH and SPS were assembled at pH 4.0 onto a glass surface. The four bilayers promoted adhesion of subsequently added layers to the surface, but did not influence the superhydrophilic behavior of the final surface. Colloidal silica nanoparticles where then alternately assembled with PAH to complete the coating. The assembly process was driven by electrostatic interactions between the PAH polycation and the negatively charged $SiO_2$ nanoparticles.

Coatings were prepared with three different sizes of colloidal silica nanoparticles to investigate the effect of particle size on coating properties. Specifically, nanoparticles with diameters of 7 nm (Ludox SM 30), 12 nm (Ludox HS 40), and 22 nm (Ludox TM 40) were used. The pH of the PAH and silica nanoparticles solutions was varied from 3.0 to about 10 to determine processing conditions that promote formation of stable superhydrophilic coatings. For 12 nm and 22 nm nanoparticles, multilayer films having more than 8 bilayers of $PAH/SiO_2$ became cloudy at a pH of less than 9, due to aggregation of the nanoparticles. Multilayer films assembled with 7 nm nanoparticles, on the other hand, remained highly transparent even after the deposition of 16 PAH/SiO$_2$ bilayers. Clouding of these films only began to appear when 24 or more bilayers had been deposited. Preferred conditions for superhydrophilic multilayers were 7 nm SiO$_2$ nanoparticles, pH 4 or pH 8-9, and at least 8 bilayers. The source of silica nanoparticles can be important for obtaining superhydrophilic behavior. Films prepared with nanoparticles obtained from other sources were of lower quality.

Figure 5A:
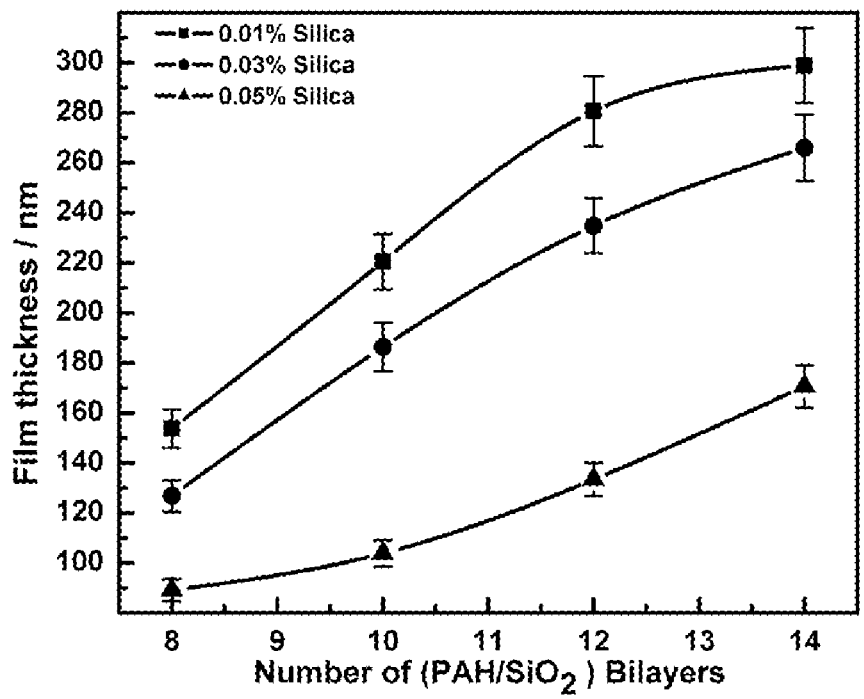
FIG. 5A is a graph depicting film thickness measurements as a function of number of bilayers.
Figure 5B:
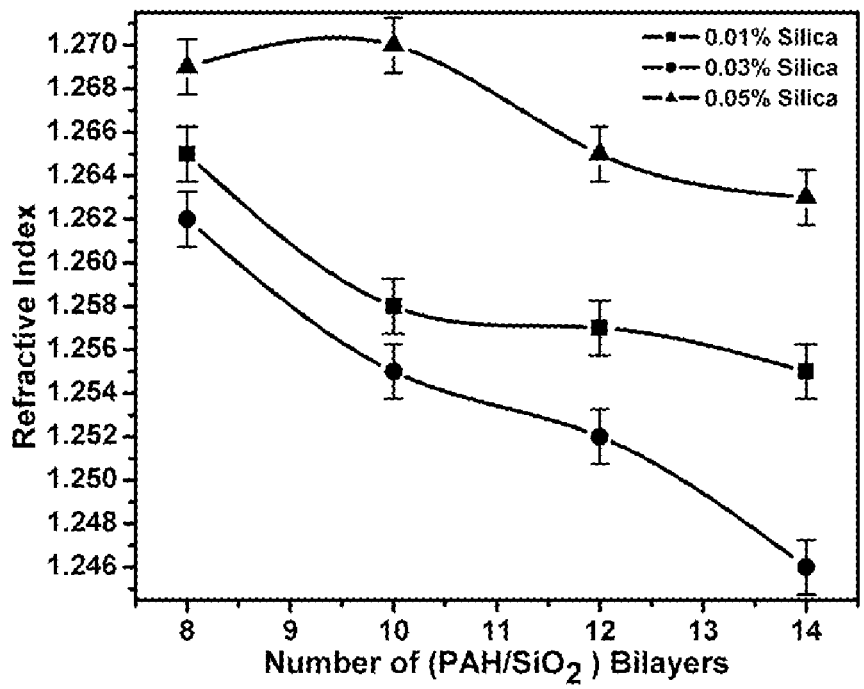
FIG. 5B is a graph depicting refractive index measurements as a function of number of bilayers.

The concentration of the SiO$_2$ nanoparticle solution used in forming the layers influenced final film properties. Concentrations in the range of 0.005% to 0.1% by weight were tested. At the extremes of the range, the resulting films were not superhydrophilic. Desirable film properties were obtained with a nanoparticle concentration in the range of 0.01% to 0.03% by weight. In this range, the thickness of the resulting film increased approximately linearly with number of bilayers deposited (see FIG. 5A). FIG. 5A displays thickness data for (PAH4.0/SiO$_2$4.0)$_x$ multilayer films. The average bilayer growth increment (average thickness deposited per bilayer) for multilayers assembled at this pH from the 0.03% nanoparticle concentration solution was 18 nm/bilayer, The bilayer growth increment for multilayer films assembled with SiO$_2$ nanoparticles can be influenced by a complex interplay of parameters such as particle charge, concentration and aggregation and the charge density of the polycation. Such parameters have been explored in detail in the literature. See, for example, Lvov, Y., et al., *Langmuir* 1997, 13, (23), 6195-6203; and Lvov, Y. M., et al., *Chemical Communications* 1998, (11), 1229-1230, each of which is incorporated by reference in its entirety. The refractive index of the film decreased with number of bilayers deposited (see FIG. 5B). All the films described in FIG. 5B exhibited a low refractive index in the range of 1.246 to 1.270. The lowest refractive index was obtained with a film having 14 bilayers fabricated with a 0.03% by weight solution of silica nanoparticles. Low refractive index is important for effective anti-reflective behavior, and can be a result of porosity in the film introduced by the packing arrangement of the nanoparticles.

Figure 5C:
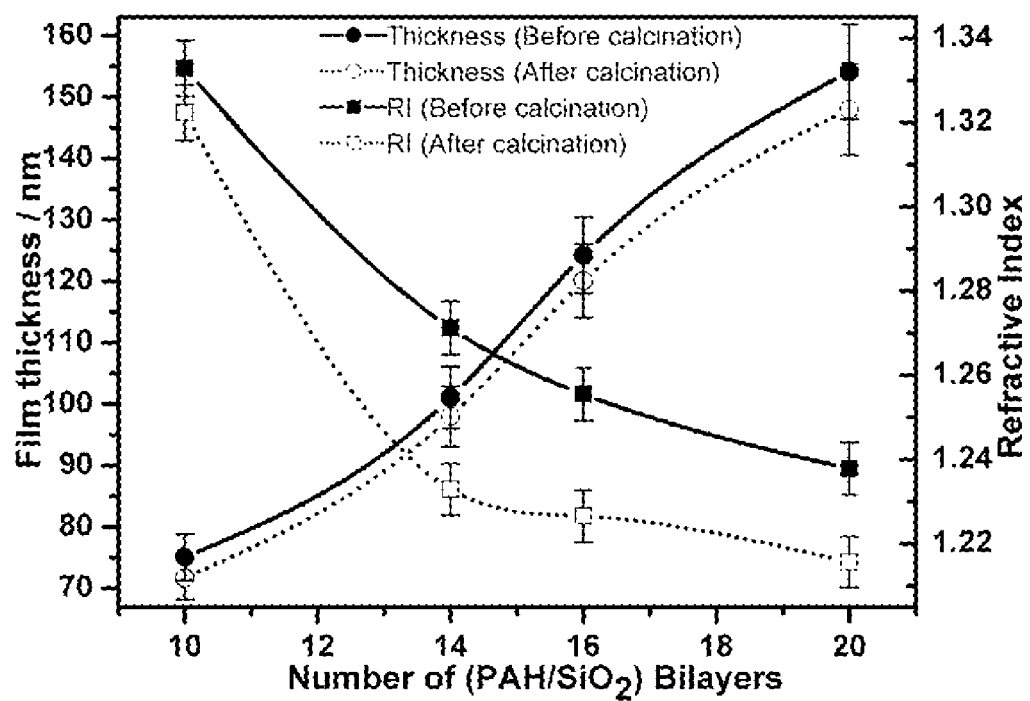
FIG. 5C is a graph depicting film thickness and refractive index measurements as a function of number of bilayers.

FIG. 5C shows how the thickness and refractive index vary as a function of the number of deposited bilayers for films assembled at a higher pH (PAH 7.5/SiO$_2$9.0)$_x$. Also included in this figure are data for calcinated films (see below). Using the optimum particle concentration (0.03%), the average bilayer thickness increment was about 7.7 nm/bilayer and refractive index values fell in the range of 1.23-1.26 for films with 14-20 bilayers. Compared to multilayer films assembled at lower pH (pH 4.0), the higher pH assembled nanoparticle multilayers exhibited a smaller bilayer thickness increment, but, at a given film thickness, somewhat lower refractive index values. The effective optical thickness of a multilayer (i.e., product of thickness and refractive index) determined the number of bilayers needed to achieve the suppression of surface reflections at a desired wavelength.

Figure 6:
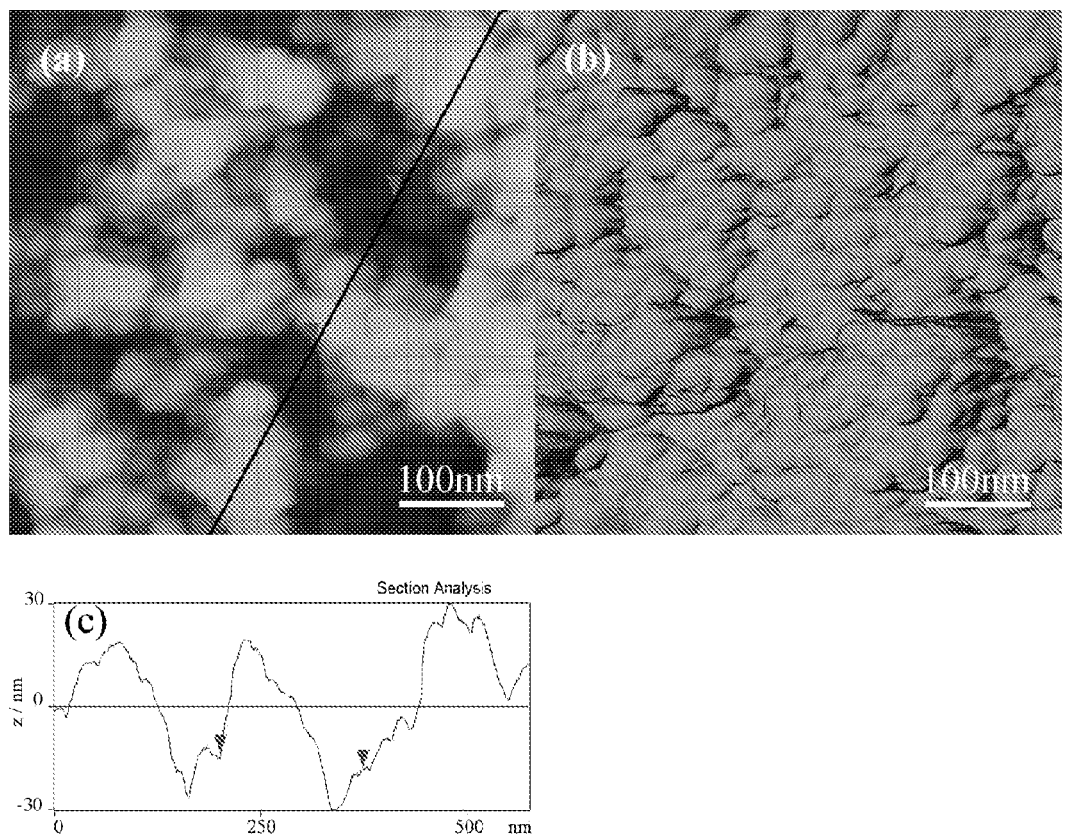
FIG. 6 is an AFM image of a superhydrophilic surface.

FIG. 6 shows an AFM image of 12 PAH/SiO$_2$ bilayer film (PAH 7.5/SiO$_2$8.0)$_{12}$ assembled from a 0.03% by weight nanoparticle solution. In the image, clearly aggregated nanoparticles can be see, that create hill-to-valley surface cavities that typically extend at least about 40-60 nm into the film as revealed by a cross-section thickness trace. The rms surface roughness was in the range of 12-16 nm.

The low refractive index resulting from the porous nature of the PAH/SiO$_2$ multilayer films gave rise to anti-reflection properties. For a glass substrate with a refractive index of about 1.5, the maximum suppression of reflective losses occurs when an anti-reflection coating has a refractive index of 1.22. The wavelength of maximum suppression is determined by the quarter-wave thickness of the coating. The quarter-wave thickness of a multilayer coating, in turn, can be tuned throughout the entire visible range and beyond by simply controlling the number of deposited bilayers. Measurements reveal (FIG. 7) that transmission levels in excess of 99% were achieved in the visible region (400 to 700 nm). For example, an 8 bilayer PAH 4.0/SiO$_2$4.0 multilayer film (thickness 97 nm) transmitted 99.6% of incident light at a wavelength of 490 nm. Without the anti-reflection coating, this glass transmitted about 92% of incident light. The ability of thin film coatings based on PAH/SiO$_2$ multilayers to effectively suppress reflective losses was further illustrated by multilayers assembled at PAH 7.5/SiO$_2$9.0 (FIG. 8). At the optimum wavelength determined by the quarter-wave film thickness, reflective losses as low as about 0.1% and transmission levels of 99.7% were readily achieved. The wavelength range of maximum suppression for all of these films was much broader than what would be expected from a single index quarter-wave anti-reflection coating (determined by comparisons with optical simulations). This indicates that a gradient refractive index profile was established in the film as a result of the nano-corrugated surface topography. See, e.g, Hiller, J.; Mendelsohn, J.; Rubner, M. F. *Nature Mater.,* 2002, 1, 59, which is incorporated by reference in its entirety.

Figure 7:
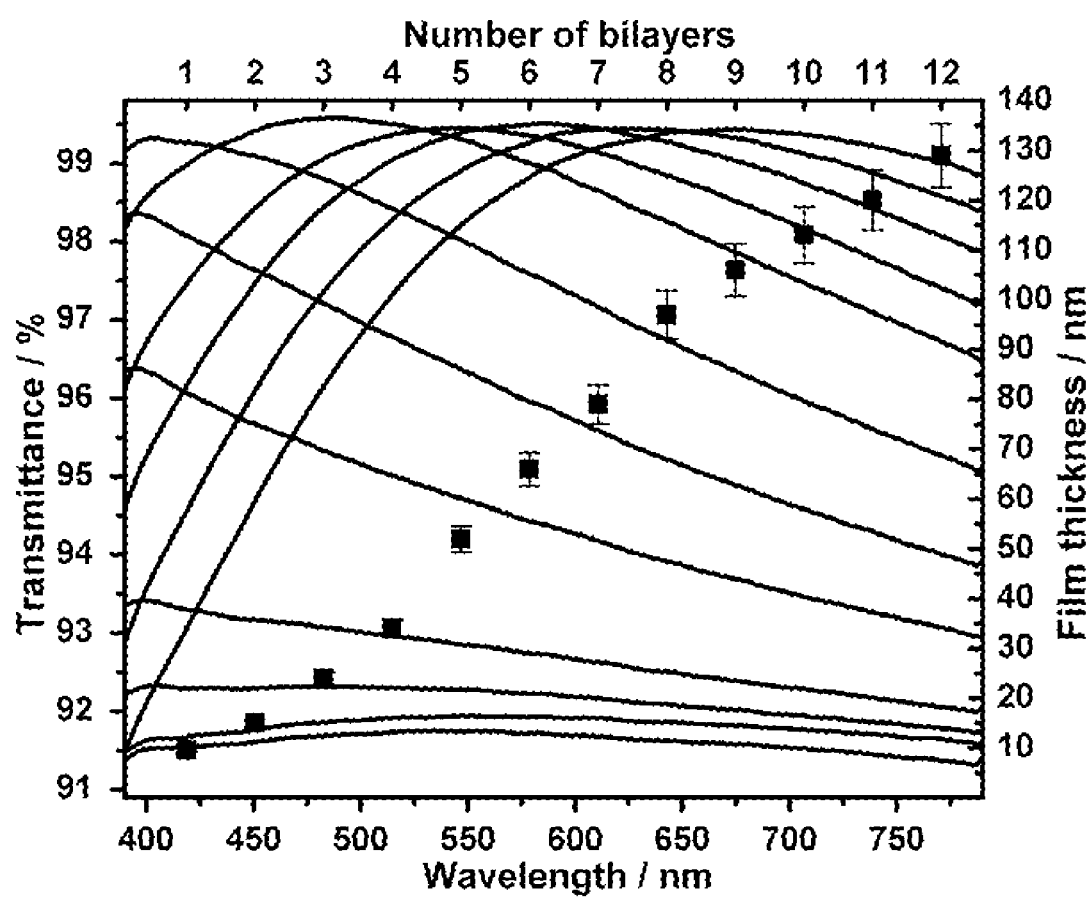
FIG. 7 is a graph depicting transmittance and thickness measurements for films having different numbers of bilayers.
Figure 8A:
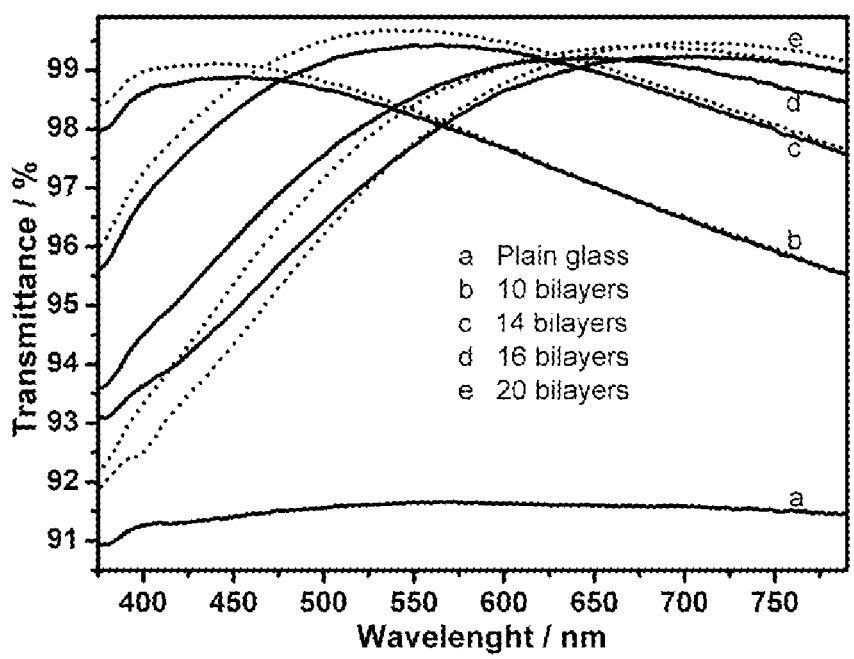
FIGS. 8A and 8B are graphs depicting transmittance and reflectance spectra for glass slides coated with polyelectrolyte multilayers.
Figure 8B:
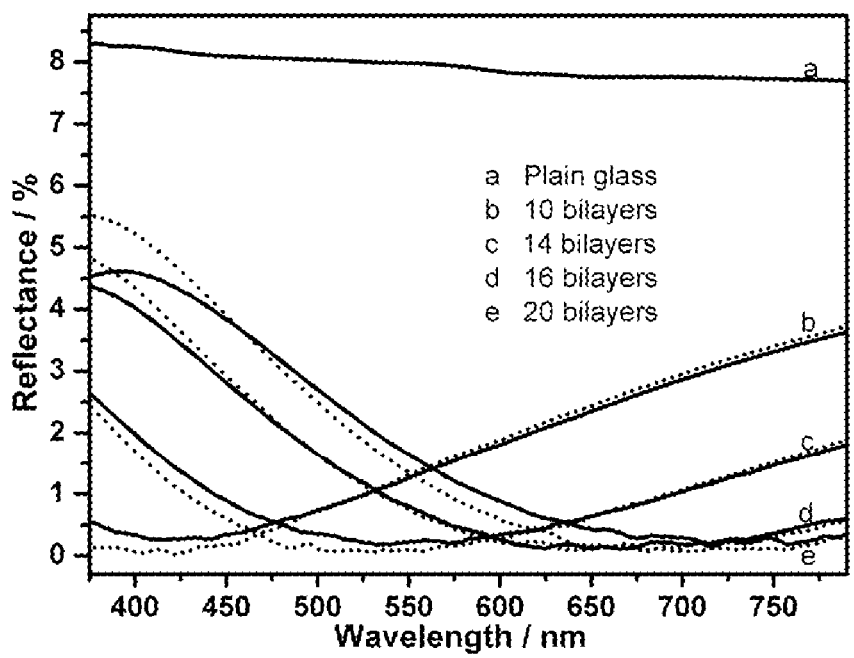

As indicated in FIGS. 7 and 8, the thickness per deposited bilayer in the case of PAH/SiO$_2$ multilayer films fabricated from 7 nm diameter SiO$_2$ nanoparticles was small enough to allow the fabrication of a family of films with quarter-wave thicknesses that span the entire visible range. This level of fine-tuning is more difficult to achieve with anti-reflection coatings based on a single layer of adsorbed silica nanoparticles. See, for example, Zhang, X-T., et al., *Chem. Mater.* 2005, 17, 696; Hattori, H., *Adv. Mater.* 2001, 13, 51; Koo, H. Y., et al., *Adv. Mater.* 2004, 16, 274; and Ahn, J. S., et al., *Colloids and Surfaces A: Physicochem. Eng. Aspects* 2005, 259, 45, each of which is incorporated by reference in its entirety. In addition, these results showed that coatings containing many layers of very small nanoparticles were more effective at suppressing reflections than single layer coatings fabricated from larger nanoparticles (99.7% versus 98.8% transmission).

A key attribute of any practical anti-fogging/anti-reflection coating is excellent mechanical durability and adhesion. The PAH/SiO$_2$ multilayer films as-prepared exhibit adhered well and exhibited mechanical integrity, but could be rubbed off with aggressive mechanical action. The mechanical stability of these films, however, was increased tremendously by heating the film to about 500° C. for four hours. This calcination process burns out the polymer component of the film and fuses the silica nanoparticles together via the formation of stable siloxane bridges. See, for example, Unger, K. K., *Porous silica: its properties and use as support in column liquid chromatography*. Elsevier Scientific Pub. Co.: Amsterdam; N.Y., 1979; p xi, 336, which is incorporated by reference in its entirety. After this process, the resultant thin film coating was able to withstand aggressive rubbing treatments and easily passed a standard scotch tape peel test (some glue residue remained on the surface, but could be removed with solvents or plasma treatment). In addition, a negligible amount of the film was removed by scratching the surface with a razor blade. This process, of course, was only possible when the multilayer films are assembled on a substrate that can withstand this high treatment temperature.

FIG. 5C shows that the thickness of an as-assembled PAH/SiO$_2$ multilayer film decreased by only a small amount after calcination. The refractive index also decreased, because the high refractive index polymer (ca. 1.5) was removed, thereby increasing the level of void volume in the film. The net result was that the optical properties of the film undergo only small changes after calcination. A comparison of FIGS. 8A and 8B reveals that the wavelength of maximum transmission/minimum reflection shifted slightly to the blue as a result of the decrease in film thickness, and the level of transmission increased due to the lower refractive index. For example, for a 14 bilayer (PAH 7.5/$SiO_2$ 9.0) film, the wavelength of maximum transmission shifted from 550 nm to 540 nm and the level of transmission increased from 99.7 to 99.8% after calcination.

Figure 9A:
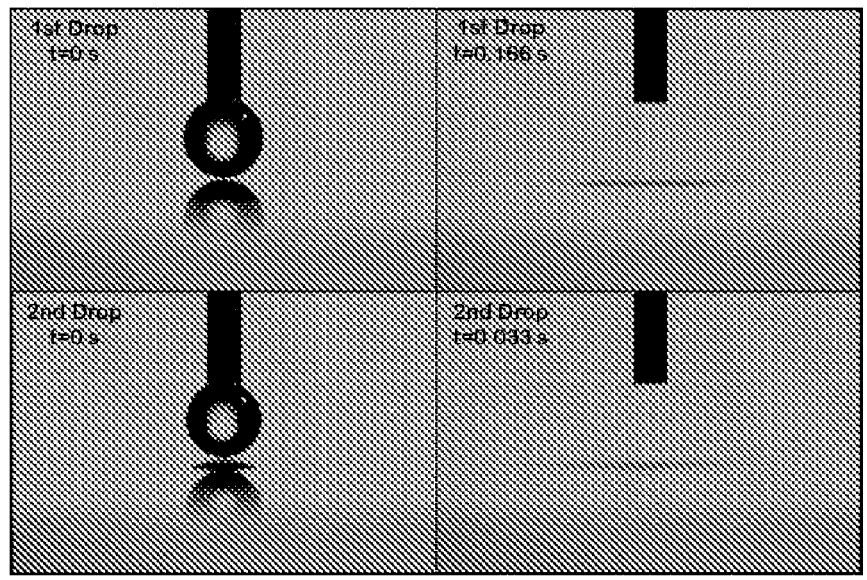
FIG. 9A is a series of video images of water drops falling on a superhydrophilic surface.
Figure 9B:
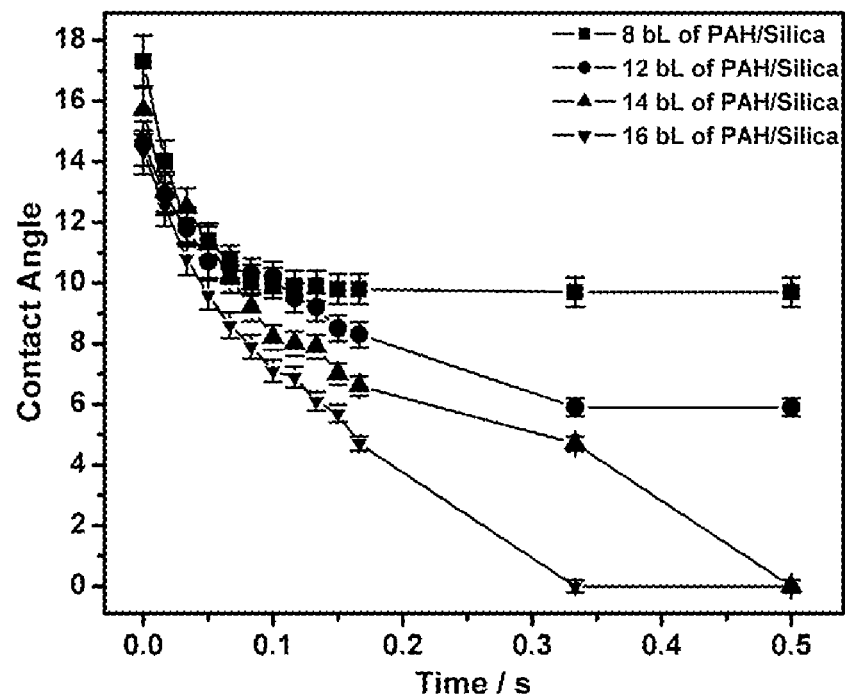
FIGS. 9B and 9C are graphs depicting contact angle measurements as a function of time for different surfaces.
Figure 9C:
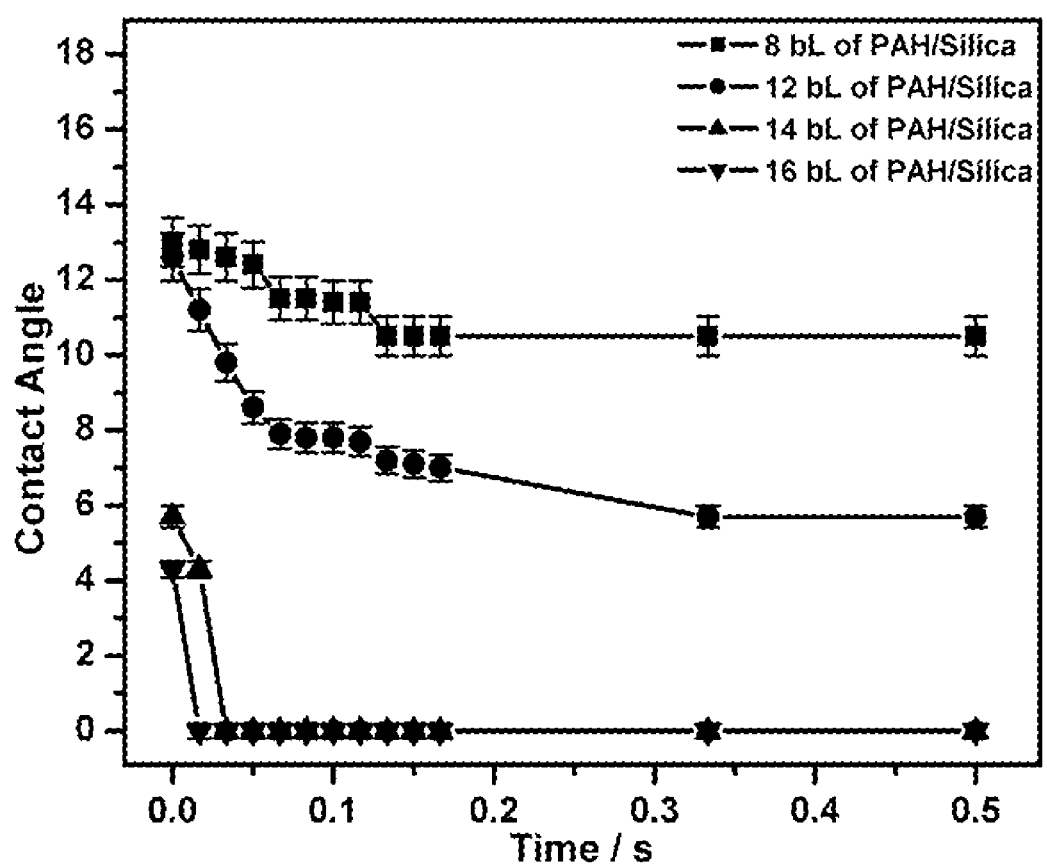

Wetting behavior of the films was examined by using a video contact angle instrument operating at 60 frames per second (16.6 ms time interval between frames). For multilayers assembled from a 0.03% by weight nanoparticle solution, at least 14 bilayers were required to create a film that was completely wetted (i.e., contact angle less than 50) with water in 0.5 seconds or less. See FIGS. 9A-C. Surfaces with fewer bilayers are highly wettable but not superhydrophilic. As shown in FIGS. 9B-9C, the wetting time for a second drop added to a surface was remarkably fast. Still images obtained from video data indicated that a first drop of water can wet the surface in 0.16 seconds, and a second drop in the same location spreads completely in 0.03 seconds.

In contrast to superhydrophilic surfaces based on $TiO_2$, the superhydrophilic behavior of PAH/$SiO_2$ multilayer films is stable for extended periods of time, in light or dark conditions, even at elevated temperatures. See FIG. 10. A sixteen bilayer (PAH 7.5/$SiO_2$ 8.0) film stored at room temperature in the dark displayed no significant change in wetting behavior over a period of at least one year. The films appeared to be stable indefinitely under these conditions. At elevated temperatures, some films (12 bilayers of PAH7.5/$SiO_2$ 8.0 with 10 bilayers of PAH/PAA as adhesion layers (0.03% by wt silica solution) retained their superhydrophilic behavior for at least 168 hours at 50° C. and about 144 hours at 80° C. Anti-fogging behavior (see below) was retained by all films heated at 50° C. for 168 hours. At the highest temperature examined, the more dramatic loss in superhydrophilicity observed with certain films at long times (>144 hours) may reflect the formation of siloxane bridges formed by the condensation of surface silanol groups by thermal dehydroxylation. See, for example, Unger, K. K., *Porous silica: its properties and use as support in column liquid chromatography*. Elsevier Scientific Pub. Co.: Amsterdam; N.Y., 1979; p xi, 336 p, which is incorporated by reference in its entirety. Dehydroxylation would render the $SiO_2$ nanoparticles more hydrophobic. The superhydrophilic behavior of films treated for long times at elevated temperatures could be completely recovered by treatment for 30 seconds in an oxygen plasma. This observation is consistent with the notion that the surface chemistry of the particles was altered at elevated temperature. From these tests, however, the possibility that the coatings became contaminated in the oven cannot be ruled out. It should be noted that the anti-reflection properties of these films did not change as a result of heat treatments. In addition, no significant differences in wetting behavior were observed between as-prepared and calcinated samples.

Figure 10:
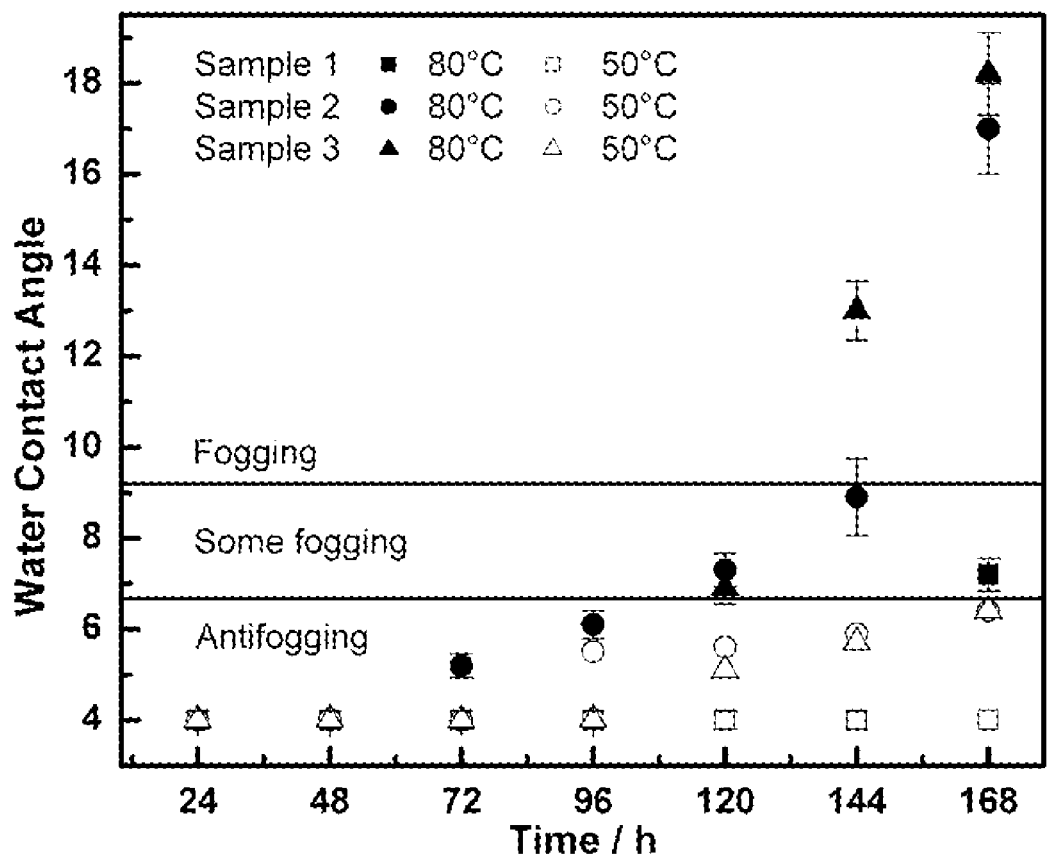
FIG. 10 is a graph depicting contact angle measurements for surfaces under different conditions.
Figure 11A:
FIG. 11A is a photograph comparing fogging behavior of glass slides with different surfaces.
Figure 11B:
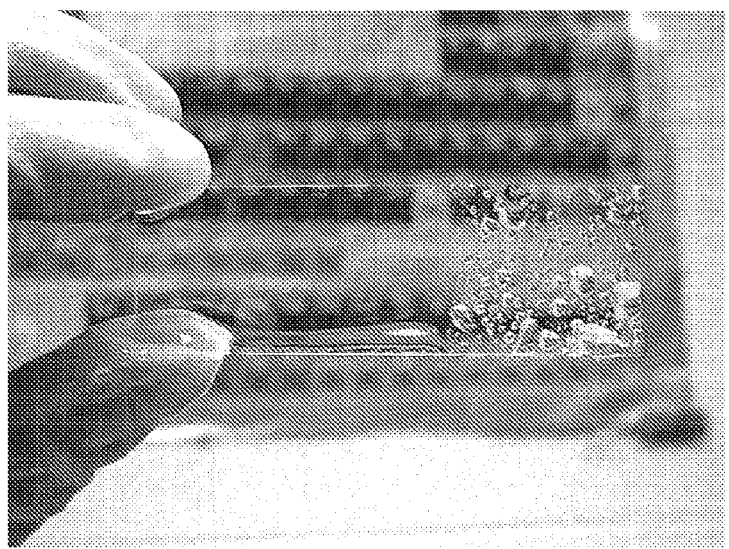
FIG. 11B is a photograph illustrating dewetting behavior of a partially coated glass slide.

As expected, a surface with a water droplet contact angle of essentially zero exhibited anti-fogging characteristics due to the fact that the nearly instantaneous, sheet-like wetting by water prevented light-scattering water droplets from forming on the surface. FIG. 10 indicates that anti-fogging behavior persisted as long as the water droplet contact angle was below about 7°. The images in FIG. 11 illustrate this effect. FIG. 11A shows two glass sides resting atop a photograph of a lotus flower. The slide to the left had a superhydrophilic coating; the slide on the right was without such a coating. Both slides were cooled in a refrigerator at about −18° C. and then moved into humid laboratory air. The uncoated slide fogged immediately whereas the coated slide remained clear. Another interesting characteristic of a superhydrophilic coating is its ability to prevent dewetting by water. As soon as a typical glass slide is withdrawn from water, the well-known dewetting phenomenon takes place (see FIG. 11B). In sharp contrast, a glass slide coated with a superhydrophilic multilayer remains fully wet after immersion in water and stays in this state until the water evaporates.

A typical (PAA/PAH/silica nanoparticle/semi-fluorosilane) superhydrophobic film was fabricated by depositing 100.5 bilayers of PAH/PAA on a glass substrate followed by low pH treatments, thermal crosslinking, silica nanoparticle deposition, a chemical vapor deposition of semifluorosilane and a final thermal treatment. PAH/PAA multilayer films were built using pH 8.5 PAH ($10^{-2}$ M by repeat unit) and pH 3.5 PAA ($10^{-2}$ M) aqueous solutions which were pH adjusted by using either 1 M NaOH or 1 M HCl. The deposition of PAH/PAA bilayers onto a glass slide was accomplished by first immersing substrates into the PAH solution for 15 min followed by one 2 min and two 1 min immersions into water as rinsing steps. Then, the substrate was immersed into the PAA solution for 15 min followed by identical rinsing steps. The adsorption and rinsing steps were repeated until the desired numbers of bilayers were obtained. One bilayer is defined as a single adsorption of a polycation followed by an adsorption of a polyanion; thus a half-integer number of bilayers of PAH/PAA ends with PAH as the outermost layer. After the initial multilayer fabrication, the film was immersed in pH 2.7 acidic water (pH-adjusted with 1 M HCl) for 2 hours followed by an immersion in pH 2.3 acidic water for 4 hours. After the film was air dried, it was crosslinked at 180° C. for two hours. 1.5 bilayers of silica nanoparticles/PAH were deposited on the crosslinked porous multilayer film by using a 0.03% aqueous colloidal dispersion of Ludox® TM-40 and a pH 7.5 PAH solution ($10^{-2}$ M by repeat unit) by first immersing the film into the silica nanoparticle suspension for 15 min followed by one 2 min and two 1 min immersions into water as rinsing steps. Then, the film was immersed into the PAH solution for 15 min followed by identical rinsing steps. The silane treatment was carried out by a chemical vapor deposition of (tridecafluoro-1,1,2,2-tetrahydrooctyl)-1-trichlorosilane. The sample was placed in a vacuum chamber together with (tridecafluoro-1,1,2,2-tetrahydrooctyl)-1-trichlorosilane. CVD was performed by applying a 1 Torr vacuum to the chamber at room temperature for 1 hour. Then, the film was placed in an oven and heated at 180° C. for 2 hours.

Poly(acrylic acid) (PAA) and poly(allylamine hydrochloride) (PAH) were used as patterning inks by dissolving in water/isopropanol mixtures (60/40 v/v) to make 1% solutions. The polyelectrolyte solutions were delivered onto a superhydrophobic surface via micropipettes. The patterned surface was rinsed with water after the solvent evaporated.

A fluorescein labeled PAH solution was made by adding 0.01% poly(fluorescein isothiocyanate allyl amine hydrochloride) (FITC-PAH) in the 0.01 M PAH solution. The pH of the solution was adjusted to 8.5 using a NaOH aqueous solution. A superhydrophobic film patterned with hydrophilic domains was first immersed into the PAH solution for 15 min followed by one 2 min and two 1 min immersions into water as rinsing steps. Then, the film was immersed into a pH 3.5 0.01 M PAA solution for 15 min followed by identical rinsing steps. The adsorption and rinsing steps were repeated until 80 layers of PAH and PAA were obtained.

Hydrophilic and superhydrophilic microcanals on a superhydrophobic surface were built using a pH 7.5 PAH ($10^{-2}$ M by repeat unit) aqueous solution and a pH 8.0 Ludox® TM-40 (0.03% by weight) silica nanoparticle aqueous suspension (pH adjusted by using a 1M NaOH aqueous solution). A superhydrophobic surface patterned with 750 μm wide hydrophilic stripes was immersed into the PAH solution for 15 min followed by one 2 min and two 1 min immersions into water as rinsing steps. Then, the film was immersed into the silica suspension for 15 min followed by identical rinsing steps. The adsorption and rinsing steps were repeated until the desired numbers of bilayers were obtained. The microcanals coated with 4 bilayers of PAH/$SiO_2$ are hydrophilic while the microcanals coated with 14 bilayers of PAH/$SiO_2$ are superhydrophilic.

Atomic Force Microscopy (AFM) height and phase images were collected using a Nanoscope IIIa in a Dimension 3000 AFM microscope (Digital Instruments, Santa Barbara) in the tapping mode in air. AFM images were obtained with scan sizes ranging from 500 nm to 5 μm and 256 samples/line.

Water drop contact angle measurements utilizing deionized water (>18 ME-cm) were performed with a VCA-2000 contact angle system (AST Products Inc, MA). Approximately 0.5 microliter water drops were placed on the multilayer coated surfaces using a syringe. Contact angle values were calculated from the dynamic video files that captured 16 frames/second rate and by using the software provided (VCA Optima XE Version 1.90) by the manufacturer.

A video of water spreading along a microcanal was performed with a VCA-2000 contact angle system (AST Products Inc, MA). An approximately 0.5 μL water drop was placed on the micocanals using a syringe. Water spreading videos were captured from the dynamic video files that captured 16 frames/second rate.

A video clip was recorded in which, water droplets ere added to a superhydrophobic surface patterned with superhydrophilic microcanals (750 microns wide) made with 14 assembled bilayers of (PAH/$SiO_2$). Small droplets of a methylene blue aqueous solution were placed onto the ends of the microcanals. The fluid moved very quickly along the superhydrophilic microcanals. The slower initial fluid movement in the first microcanal was due to the creation of a small bubble upon addition of the droplet. This demonstrated that the capillary force generated by the nanoporous superhydrophilic coating has to overcome the surface tension of the bubble to drive the fluid. The diffusion of the liquid accelerated after more liquid is added and the bubble burst.

A superhydrophobic surface was wetted a mixture of water and 2-propanol, a low surface tension liquid. The surface tension of water is 72.2 mJ/$m^2$; the surface tension of 2-propanol is 21.7 mJ/$m^2$. FIG. 12 shows the contact angle of water/2-propanol mixtures on a superhydrophobic surface. A 60/40 (v/v) mixture of water/2-propanol was used as the solvent for a 1% solution of poly(fluorscein isothiocyanate allylamine hydrochloride) (FITC-PAH), to provide wetting of the superhydrophobic surface without excessive spreading of the solution of the surface.

A pattern of microdrops of 1% FITC-PAH in 60/40 (v/v) water/2-propanol was micropipetted onto a superhydrophobic surface, and the solvent allowed to evaporate. The surface was then rinsed with deionized water to remove any loosely bound polyelectrolytes. The fluorescence intensity of the fluorescein isothiocyanate was analyzed to monitor the density of FITC-PAH on the surface. The fluorescence intensity of the patterned domains decreased after the rinse step, suggesting the removal loosely bound polyelectrolyte. However, because some FITC-PAH remained on the surface, the contact angle and contact angle hysteresis of the patterned domains changed significantly: the advancing contact angle was 149°, and the receding contact angle was 66°. X-ray photoelectron spectroscopy (XPS) confirmed that the atomic concentration of nitrogen in the patterned area increased from 1.0% to 2.6%, and the atomic concentration of carbon increased from 24.0% to 26.6%. These results indicated that FITC-PAH anchored on the superhydrophobic surface were responsible for the altered wetting characteristics of the patterned domains.

An array of hydrophilic spots with size 750 μm in diameter was deposited on a superhydrophobic surface using a solution of PAA in water/2-propanol. The advancing water contact angle in the patterned region was 144°, and the receding contact angle was 12°. Spraying a mist of water on to the patterned surface led to formation of small water droplets (~250 μm) that did not wet the superhydrophobic surface, and formed nearly perfect spheres. Most of the droplets bounced and rolled on the superhydrophobic regions and eventually stuck to the patterned hydrophilic regions and eventually stuck to the patterned hydrophilic regions where large water droplets were formed. The process mimicked the water capturing capabilities of the *Stenocara* beetle of the Namib desert, which uses a hydrophilic/superhydrophobic patterned wing surface to collect water for drinking from airborne moisture (see Parker, A. R. and Lawrence C. R., *Nature* 2001, 414, 33, which is incorporated by reference in its entirety).

Charged small molecules (as opposed to polymers) can also bind to a superhydrophobic surface and alter its wetting properties. A superhydrophobic surface was patterned with a 0.1% 2-propanol solution of methylene blue (a positively charged dye) and a 0.1% 2-propanol solution of rose Bengal (a negatively charged dye). The patterned areas became hydrophilic after the dye was deposited on the surface. however, unlike the areas patterned with polyelectrolytes, these areas regained their superhydrophobic properties after the dyes were washed away with water. This can be because charged small molecules do not have long polymer chains with multiple charge sites. Without multiple charge sites, the electrostatic interactions with the polyelectrolytes or nanoparticles of the surface may not be strong enough to prevent washing away. Some dye was conveyed into the semi-fluorosilane network and became trapped there, as indicated by the color that remained in the patterned area. A simple water rinse did not remove the trapped dye (the superhydrophobic surface prevents water infiltration). If the surface was first rendered hydrophilic by treating with a PAA-water/2-propanol solution, the dyes could then be released from the surface upon immersion in water. Thus, the surface treatments provide a method for controllable loading and releasing of compounds from the surface.

Once a pattern of hydrophilic regions is established on a superhydrophobic surface, additional materials can be applied to those regions using layer-by-layer processing. Because the superhydrophobic regions repel aqueous reagents, only the initial patterning steps requires selective application of reagent to the surface. Further steps can be carried by immersing the surface. Only the hydrophilic regions will participate in the layer-by-layer assembly. A patterned polyelectrolyte multilayer was assembled on a superhydrophobic surface using this approach. The construction of PAH/PAA multialayers was monitored by incorporating 0.01% FITC-PAH into the PAH solution. The superhydrophobic surface remained superhydrophobic during more than 240 sequential exposures to polycation, polyanion, and water solutions.

Figures 13C, 13D:
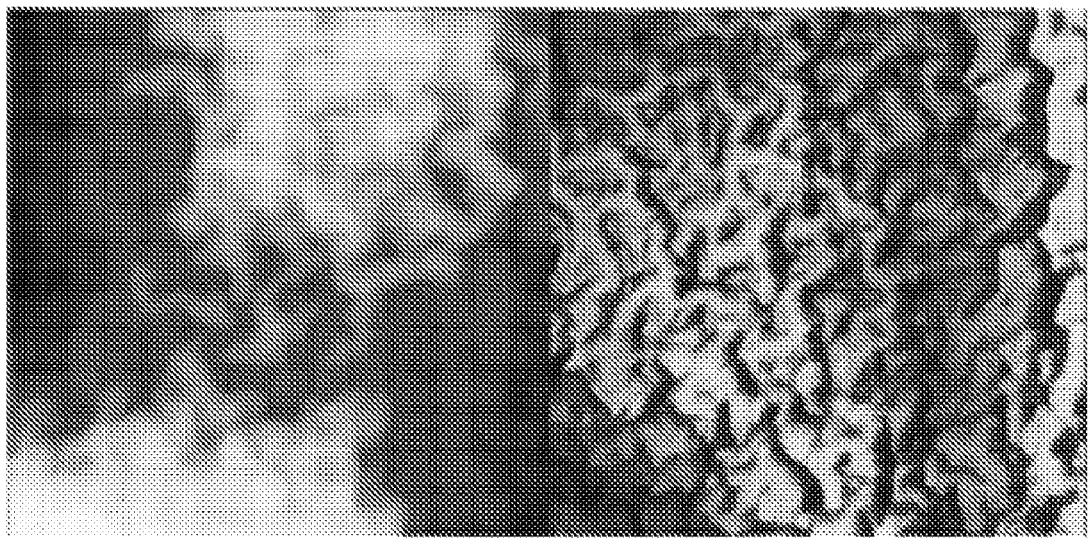

The resulting (PAH/PAA)$_{40}$ multilayer had an advancing contact angle of 71°, and a receding contact angle of 25°. FIGS. 13A-B show atomic force micrographs of the superhydrophobic regions (FIG. 13A, height; FIG. 13B, phase). Silica nanoparticles (20 nm diameter) were clearly observed.

In the patterned regions, (FIGS. 13C-D; height and phase, respectively), the nanoparticles were no longer visible. The decrease in surface rms roughness from 54 nm to 40 nm after the multilayer deposition further supports the idea that polyelectrolytes can be selectively assembled on to the patterned area. Each of FIGS. 13A-D is 1 μm in size.

Figure 14A:
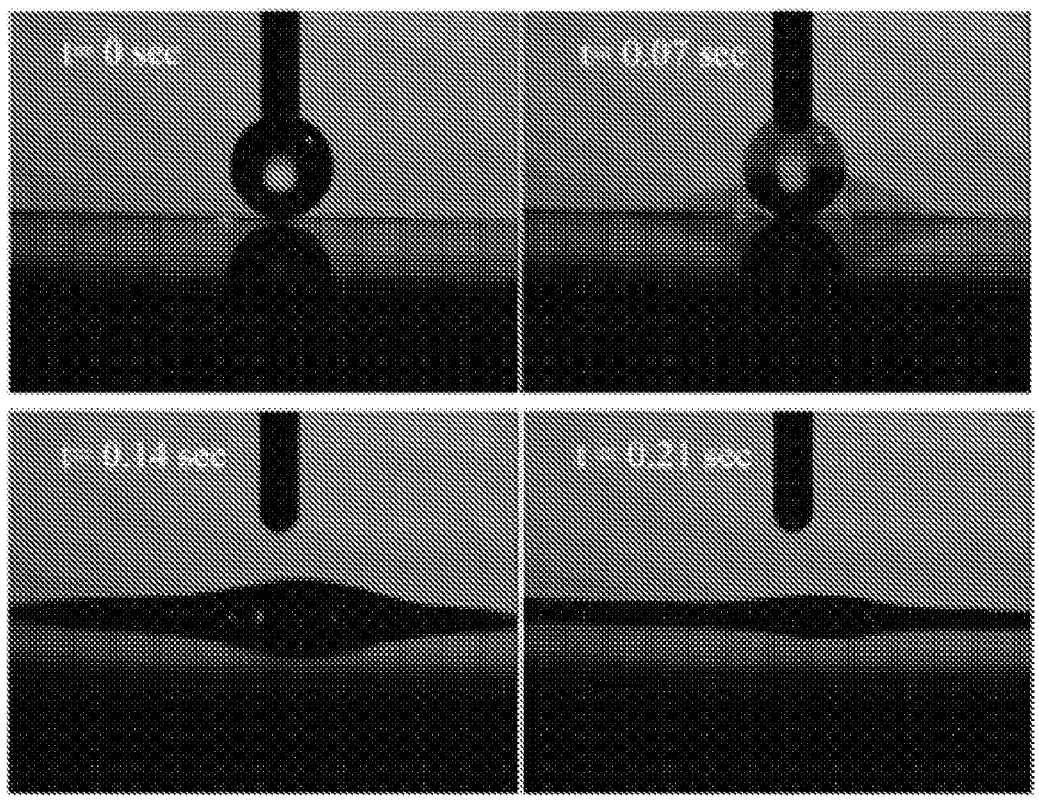
FIGS. 14A-B are video images showing wetting behavior of surfaces.
Figure 14B:
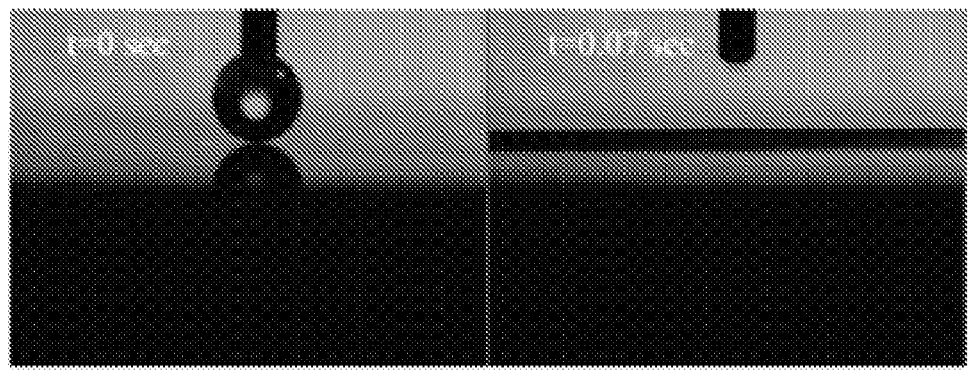

The patterned multilayers can be superhydrophilic multilayers. See, for example U.S. patent application Ser. No. 11/268,547, which is incorporated by reference in its entirety. Using this approach, superhydrophilic regions, 750 μm in width, were formed on a superhydrophobic surface. A variety of such regions having different numbers of PAH/SiO$_2$ bilayers were prepared, and their wetting properties investigated. As illustrated in FIG. 14A, it took more than 10 seconds for a water droplet to spread 1 cm along a 750 μm-wide region having 4 PAH/SiO$_2$ bilayers. The observation of a small bulge at t=0.21 seconds indicated that the capillary force of the coating cannot distribute the water quickly enough to be superhydrophilic. For a region having 14 PAH/SiO$_2$ bilayers, however, water spread completely along a 6-cm long region in 2 seconds (FIG. 14B). This observation was consistent with previous observations that a sufficient number of PAH/SiO$_2$ bilayers is needed to create stable superhydrophilic behavior. See, for example, U.S. patent application Ser. No. 11/268,547, which is incorporated by reference in its entirety.

As water was added to a superhydrophilic microchannel water level increased with a continuously increase contact angle at the edge of the microchannel. When the contact angle exceed 90°, stability was lost and a bulge formed in the microchannel. The bulge disappeared when the contact angle fell below 90°, in agreement with the work of Gau et al., Science 1999, 283, 46, which is incorporated by reference in its entirety. Such bulges can be used advantageously, for example, to form a liquid junction or bridge between two nearby microchannels to allow mixing of liquids between the microchannels without altering the wetting properties of the intervening superhydrophobic surface. The junction can be severed by simply withdrawing liquid from or both microchannels.

Figure 15:
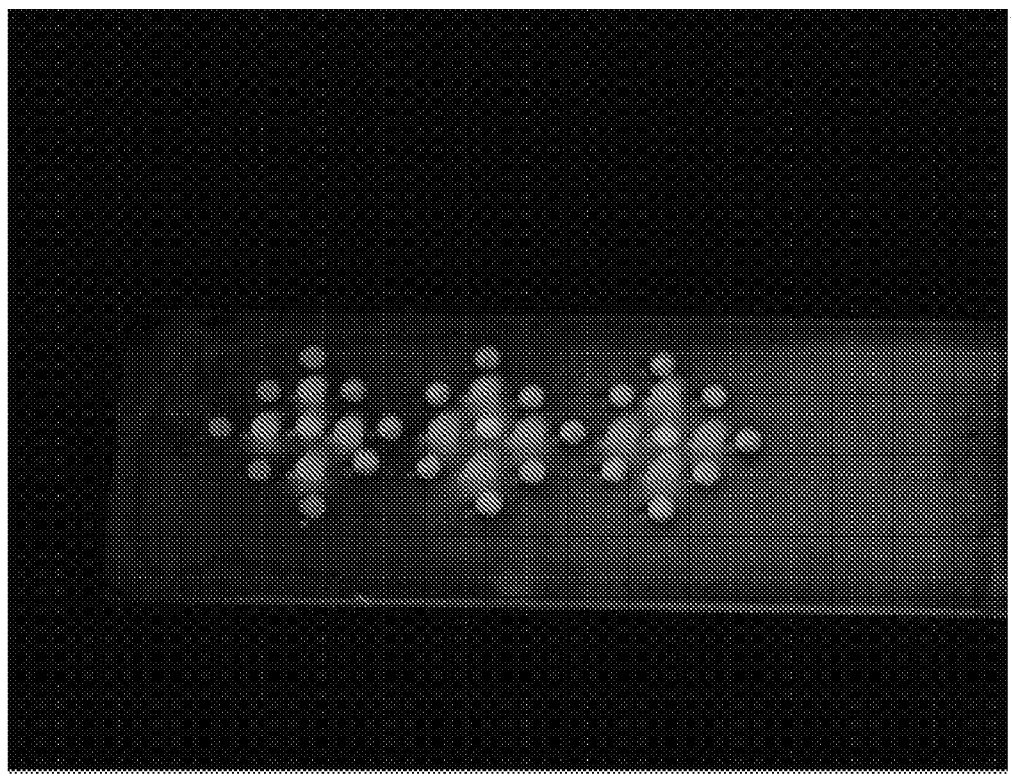
FIG. 15 is a photograph showing water droplets on hydrophilic spots located on a background of superhydrophilic surface.

Surfaces having patterns of extreme wetting properties can provide small, densely packed reaction sites for the rapid evaluation of complex biomolecular interactions. FIG. 15 shows an array of circular hydrophilic spots with diameter 750±30 μm on a superhydrophobic surface. Aliquots (2 μL) of solutions of various UV-excitable fluorescent dyes (AMCA, blue; rhodamine, red; and fluorescein, green) were deposited onto individual spots. Using the same techniques, desired functionalization reagents could be delivered to a spot, providing a simple approach to explore, for example, cell viability, adhesion, or response to reagents.

Figure 16:
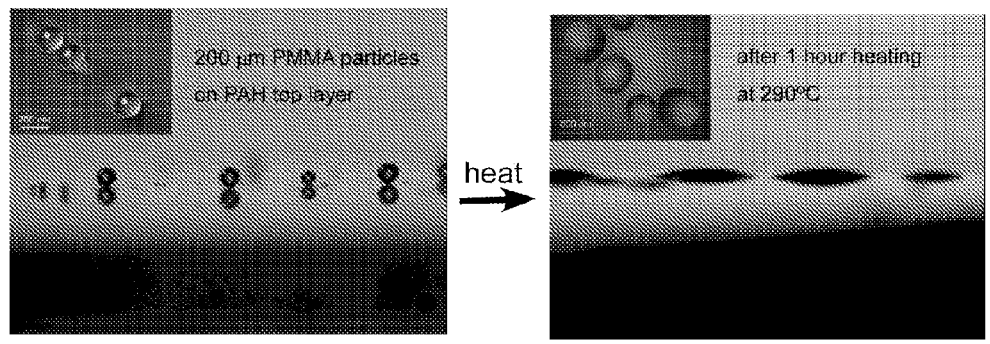
FIG. 16 illustrates formation of a non-planar surface by melting plastic beads.

A "bumpy" surface was created where the elevated "bumps" were hydrophilic while the surrounding surface was superhydrophobic. Micron-sized particles of poly(methyl methacrylate) (PMMA) were deposited onto a polyelectrolyte multilayer film (or amine-modified glass slide) and subsequently melted to create the desired bumpy surface texture (see FIG. 16). The size and shape of the bumps were controlled by adjusting particle density, heating time and temperature. Once the bumpy surface texture was established, the surface was over-coated with a porous superhydrophobic polyelectrolyte multilayer film. The hydrophilic regions were then created by contacting the tops of the raised regions (or "bumps") of the surface with a rubber stamp previously inked with an alcohol solution containing a polyelectrolyte. This process creates a surface structure that mimics that of the Namib desert beetle: raised superhydrophobic bumps capped with water-collecting hydrophilic regions.

Figure 17:
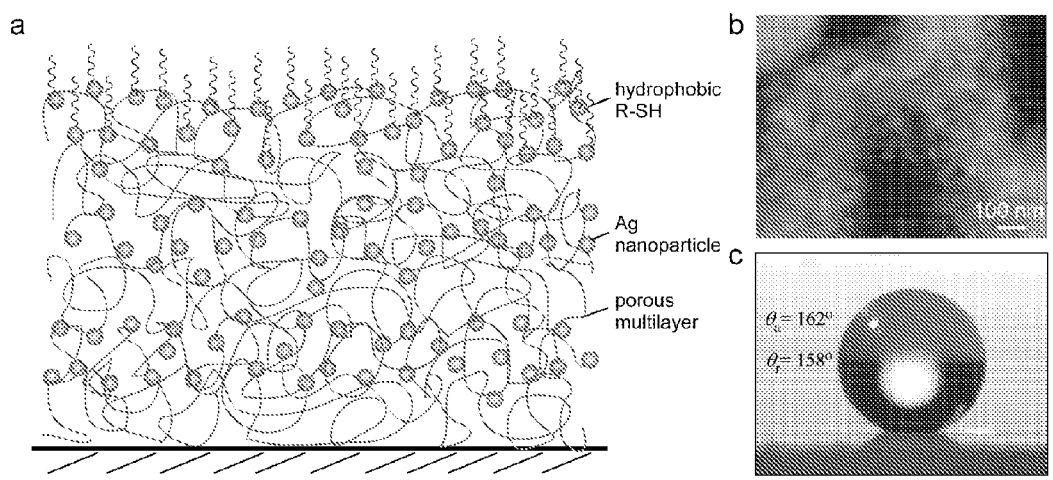
FIGS. 17A-C illustrate features and properties of a polyelectrolyte multilayer including silver nanoparticles.

A superhydrophobic multilayer film was prepared in which silver nanoparticles were used in place of silica nanoparticles (see FIG. 17). In this film the surface layers of silver nanoparticles provide both the nanoscale texturing needed for superhydrophobicity and surface-based anti-bacterial activity. As indicated in FIG. 17A, the silver nanoparticles were treated with an alkyl thiol molecule (R-SH) to render the top surface hydrophobic. FIG. 17B is an AFM image of silver nanoparticles on the surface of the microporous multilayer. The final film was a superhydrophobic coating (advancing contact angle about 160°, receding 158°, see FIG. 17C) with silver nanoparticles throughout the multilayer film (including the top surface). The silver nanoparticles within the superhydrophobic film provided a reservoir of anti-bacterial silver ions that can be released from the hydrophilic portals of the patterned coatings or from defects in the superhydrophobic coating.

Figures 18A, 18B:
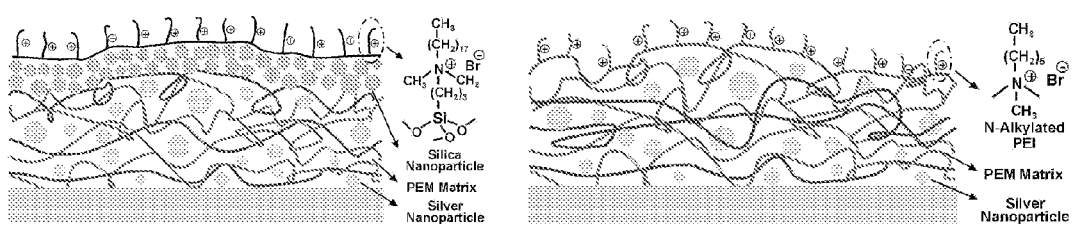
FIGS. 18A-B illustrate polyelectrolyte multilayers including covalently bound quaternary amines.

Non-releasable, chemically bound bactericidal elements based on quaternary ammonium salts were also incorporated into polyelectrolyte multilayers. By using techniques developed for controlling the functional group density in the hydrophilic regions of the coating, two different types of quaternary ammonium salts were covalently attached to polyelectrolyte materials. The structures of the resultant hydrophilic regions are illustrated schematically in FIG. 18A (a quaternary ammonium salt attached covalently to silica nanoparticles) and FIG. 18B (a quaternary ammonium salt attached covalently to polyethyleneimine (PEI)).

Other embodiments are within the scope of the following claims.

What is claimed is:

1. A patterned surface comprising:
   a substrate supporting a superhydrophobic coating, the superhydrophobic coating including a high-roughness polyelectrolyte multilayer, a nanometer-scale feature associated with the high-roughness polyelectrolyte multilayer, and a hydrophobic material; and
   a region of reduced hydrophobicity superimposed on a predetermined region of the superhydrophobic coating, wherein the region of reduced hydrophobicity is a superhydrophilic region.

2. The surface of claim 1, wherein the high-roughness polyelectrolyte multilayer includes a first organic polyelectrolyte.

3. The surface of claim 2, wherein the high-roughness polyelectrolyte multilayer includes a second organic polyelectrolyte.

4. The surface of claim 3, wherein the nanometer-scale feature includes a nanoparticle.

5. The surface of claim 4, wherein the hydrophobic material includes a fluoropolymer.

6. The surface of claim 5, wherein the region of reduced hydrophobicity further includes a third organic polyelectrolyte.

7. The surface of claim 1, further comprising an antibacterial agent.

8. The surface of claim 7, wherein the antibacterial agent includes a silver nanoparticle or a quaternary amine.

9. The surface of claim 1, wherein the high-roughness polyelectrolyte layer has an rms roughness of 100 nm or greater.

10. The surface of claim 1, wherein the nanometer-scale feature is between 1 to 1000 nanometers.

* * * * *